United States Patent
Bang et al.

(10) Patent No.: US 10,316,639 B2
(45) Date of Patent: Jun. 11, 2019

(54) SYSTEM AND METHOD FOR ANALYZING WELLBORE SURVEY DATA TO DETERMINE TORTUOSITY OF THE WELLBORE USING DISPLACEMENTS OF THE WELLBORE PATH FROM REFERENCE LINES

(71) Applicant: GYRODATA, INCORPORATED, Houston, TX (US)

(72) Inventors: Jon Bang, Trondheim (NO); Onyemelem Jegbefume, Cypress, TX (US); Adrian Guillermo Ledroz, Houston, TX (US); John Lionel Weston, Christchurch (GB)

(73) Assignee: Gyrodata, Incorporated, Houston, TX (US)

( * ) Notice: Subject to any disclaimer, the term of this patent is extended or adjusted under 35 U.S.C. 154(b) by 873 days.

(21) Appl. No.: 14/612,162

(22) Filed: Feb. 2, 2015

(65) Prior Publication Data
US 2015/0240620 A1   Aug. 27, 2015

Related U.S. Application Data

(60) Provisional application No. 62/085,035, filed on Nov. 26, 2014, provisional application No. 62/050,019, (Continued)

(51) Int. Cl.
*G06F 11/30*   (2006.01)
*E21B 47/00*   (2012.01)
(Continued)

(52) U.S. Cl.
CPC ............ *E21B 47/00* (2013.01); *E21B 47/022* (2013.01); *E21B 47/024* (2013.01);
(Continued)

(58) Field of Classification Search
CPC ...................................................... E21B 47/00
See application file for complete search history.

(56) References Cited

U.S. PATENT DOCUMENTS 5,390,748 A   2/1995   Goldman
5,821,414 A   10/1998  Noy et al.
(Continued)

FOREIGN PATENT DOCUMENTS

WO   WO 2013/126074     8/2013
WO   2016-077239 A1   5/2016

OTHER PUBLICATIONS

Amorin et al., "application of Minimum Curvature Method to WEllpath Calculations", Research Journal of Applied Sciences, Engineering, and Technology, vol. 2 (Oct. 25, 2010): 697-686.*
(Continued)

*Primary Examiner* — Phuong Huynh
(74) *Attorney, Agent, or Firm* — Pramudji Law Group PLLC; Ari Pramudji

(57) ABSTRACT

A system and method for providing information regarding the tortuosity of a wellbore path is provided. The method includes receiving data from a plurality of survey stations of a wellbore survey. The method further includes defining a plurality of reference lines for the wellbore path. The method further includes determining a plurality of displacements of the wellbore path from the plurality of reference lines.

21 Claims, 27 Drawing Sheets

Related U.S. Application Data filed on Sep. 12, 2014, provisional application No. 61/943,205, filed on Feb. 21, 2014.

(51) Int. Cl.
| | |
|---|---|
| E21B 47/024 | (2006.01) |
| E21B 47/12 | (2012.01) |
| E21B 47/022 | (2012.01) |
| G01V 1/40 | (2006.01) |
| G01V 3/18 | (2006.01) |

(52) U.S. Cl.
CPC .............. *E21B 47/124* (2013.01); *G01V 1/40* (2013.01); *G01V 3/18* (2013.01)

(56) References Cited

U.S. PATENT DOCUMENTS

| | | | |
|---|---|---|---|
| 6,405,808 | B1 | 6/2002 | Edwards et al. |
| 6,789,018 | B1 | 9/2004 | Khan |
| 7,630,914 | B2 | 12/2009 | Veeningen et al. |
| 7,653,563 | B2 | 1/2010 | Veeningen et al. |
| 2003/0037963 | A1* | 2/2003 | Barr ..................... E21B 47/022 175/40 |
| 2006/0271299 | A1 | 11/2006 | Ward et al. |
| 2008/0149331 | A1* | 6/2008 | Fitzgerald ............... E21B 43/10 166/255.1 |
| 2008/0164063 | A1 | 7/2008 | Grayson |
| 2013/0024174 | A1 | 1/2013 | Abasov et al. |
| 2014/0172303 | A1 | 6/2014 | Ibrahim |
| 2015/0134257 | A1 | 5/2015 | Erge et al. |
| 2015/0226052 | A1 | 8/2015 | Samuel et al. |
| 2015/0240622 | A1 | 8/2015 | Bang et al. |
| 2015/0369042 | A1 | 12/2015 | Samuel et al. |
| 2016/0209546 | A1 | 7/2016 | Ramsay et al. |
| 2016/0281490 | A1 | 9/2016 | Samuel |
| 2017/0204720 | A1 | 7/2017 | Samuel et al. |

OTHER PUBLICATIONS

Grisan et al. "A novel method for the automatic evaluation of retinal vessel tortuosity", Proceedings of the 25th Annual International Conference of the IEEE Engineering in Medicine and Biology Society, vol. 1, (Sep. 17, 2003): 866-869.*

Amorin et al., "Application of Minimum Curvature Method to Wellpath Calculations", Research Journal of Applied Sciences, Engineering, and Technology, vol. 2, (Oct. 25, 2010): 679-686.

Hesig et al., "Continuous borehole curvature estimates while drilling based on downhole bending moment measurement", SPE Annual Technical Conference and Exhibition (Sep. 29, 2004); 1-14.

Mitchell et al. "Lateral Buckling—The Key to Lockup." SPE Drilling and Completion 26.3 (Sep. 2011): 436-452.

PCT Search Report and Written Opinion dated May 12, 2015 in International Application No. PCT/US2015/014909.

PCT Search Report and Written Opinion dated May 13, 2015 in International Application No. PCT/US2015/014910.

Weijermans et al., "Drilling with rotary steerable system reduces wellbore tortuosity", SPE/IADC Drilling Conference, (Mar. 1, 2001): 1-10.

Weltzin et al. "Measuring Drillpipe Buckling Using Continuous Gyro Challenges Existing Theories." SPE Drilling and Completion (Dec. 2009): 464-472.

UKIPO Prosecution from GB 1615706.7.

UKIPO Prosecution from GB 1615705.9.

Chen et al., Hole Quality: Why It Matters, SPE 74403, Feb. 10-12, 2002, pp. 1-12, SPE International Society of Petroleum Engineers.

Gaynor et al., Quantifying Tortuosities by Friction Factors in Torque and Drag Model, SPE 77617, Sep. 29-Oct. 2, 2002, pp. 1-8, SPE International Society of Petroleum Engineers.

Gaynor et al., Tortuosity versus Micro-Tortuosity—Why Little Things Mean a lot, SPE/IADC 67818, Feb. 27-Mar. 1, 2001, pp. 1-12, SPE International Society of Petroleum Engineers.

Lesso, Jr., et al., Continuous Direction and Inclination Measurements Revolutionize Real-Time Directional Drilling Decision-Making, SPE/IADC 67752, Feb. 27-Mar. 1, 2001, pp. 1-15, SPE International Society of Petroleum Engineers.

McSpadden, et al., Advanced Casing Design With Finite-Element Model of Effective Dogleg Severity, Radial Displacements, and Bending Loads, SPE141458, Sep. 2012, 436-448pgs, SPE Drilling & Completion.

Menand et al., Buckling of Tubulars in Actual Field Conditions, SPE 102850, Sep. 24-27, 2006, pp. 1-13, SPE International Society of Petroleum Engineers.

Noetic Deformation Interpretation, Rev. 4, Jul. 26, 2011, 2 pgs.

Oag et al., The Directional Difficulty Index—A New Approach to Performance Benchmarking, IADC/SPE 59196, Feb. 23-25, 2000, pp. 1-9, SPE International Society of Petroleum Engineers.

Samuel et al., Wellbore Tortuosity, Torsion, Drilling Indices, and Energy: What do They have to do with Well Path Design? SPE 124710, Oct. 4-7, 2009, pp. 1-14, SPE International Society of Petroleum Engineers.

Stockhausen et al., Continuous Direction and Inclination Measurements Lead to an Improvement in Wellbore Positioning, SPE/IADC79917, Feb. 19-21, 2003, pp. 1-16, SPE International Society of Petroleum Engineers.

Smyth, T., "Nyquist Sampling Theorem", Department of Music, University of California, Oct. 17, 2017, accessed Wine at: musicweb.ucsd.edu/~trwmyth/digitalAudio170/Nyquist_Sampling_Theorem.html on Oct. 18, 2018.

Marck, J. and Detournay, E., "Spiraled Boreholes: An Expression of 3D Directional Instability of Drilling Systems", SPE/IADC Drilling Conference and Exhibition, London, United Kingdom, Mar. 17-19, 2015, Society of Petroleum Engineers, 2015, pp. 1-25.

Mitchell, R., et al., "Drillstring Analysis with a Discrete Torque/Drag Model", SPE Drilling & Completion, Mar. 2015, pp. 5-16.

Nolen-Hoeksema, R., "Flow Through Pores", Oilfield Review, Autumn 2014: 26, No. 3, pp. 63-64.

Marck, J. et al., "Analysis of Spiraled Borehole Data using a Novel Directional Drilling Model", 2014 IADC/SPE Drilling Conference and Exhibition, Fort Worth, Texas, USA, Mar. 4-6, 2014, Society of Petroleum Engineers, 2014, pp. 1-18.

Ozgumus, T., "Determination of Kozeny Constant Based on Porosity and Pore to Throat Size Ratio in Porous Medium with Rectangular Rods", Engineering Applications of Computational Fluid Mechanics, vol. 8, No. 2, 2014, pp. 308-318.

Reid, L.C., et al., "Pump-Friendly Wellbore Design and Case Study from Mississippian Play of Oklahoma/Kansas", SPE Unconventional Resources Conference, Calgary, Alberta, Canada, Nov. 5-7, 2013, Society of Petroluem, Engineers, 2013, pp. 1-16.

Komova, T., et al., "Optimizing ESP Performance in the Kharyaga Field", SPE Artic and Extreme Environments Conference & Exhibition, Moscow, Russia, Oct. 15-17, 2013, Society of Petroleum Engineers, 2013, pp. 1-14.

Sugiura, J., et al., "Downhole Steering Automation and New Survey Measurement Method Significantly Improves High-Dogleg Rotary Steerable System Performance", SPE Annual Technical Conference and Exhibition, New Orleans, Louisiana, USA, Sep. 30-Oct. 2, 2013, Society of Petroleum Engineers, 2013, pp. 1-10.

Samuel, R. and Gao, D., "Horizontal Drilling Engineering—Theory, Methods and Application", SigmaQuadrant, Feb. 2013, pp. 315-317, 320-333.

Anitha, J., et al., "A Hybrid Genetic Algorithm based Fuzzy Approach for Abnormal Retinal Image Classification," Developments in Natural Intelligence Research and Knowledge Engineering Advancing Applications, Information Science Reference, 2012, Chapter 3.

Matyka, M. and Koza, Z., "How to Calculate Tortuosity Easily?" AIP Conf. Proc. 1453, 2012, pp. 1-6.

Jamieson, A., "Introduction to Wellbore Positioning", The Research Office of the University of the Highlands and Islands, 2012, pp. 52-54 and 181-183.

Brands, S., et al., "Scaled Tortuosity Index: Quantification of Borehole Undulations in terms of Hole Curvature, Clearance and

(56) References Cited

OTHER PUBLICATIONS

Pipe Stiffness", IADC/SPE Drilling Conference and Exhibition, San Diego, California, USA, Mar. 6-8, 2012, Society of Petroleum Engineers, 2012, pp. 1-10.
Ekseth, R., et al., "Improving the Quality of Ellipse of Uncertainty Calculations in Gyro Surveys to Reduce the Risk of Hazardous Events like Blowouts or Missing Potential Production through Incorrect Wellbore Placement", SPE/IADC Drilling Conference and Exhibition, Amsterdam, The Netherlands, Mar. 1-3, 2011, Society of Petroleum Engineers, 2011, pp. 1-15.
Mednand, S., et al., "Buckling of Tubulars in Simulated Field Conditions", SPE Drilling & Completion, Jun. 2009, pp. 276-285.
Menand S. et al "Axial Force Transfer of Buckled Drill Pipe in Deviated Wells", SPE/IADC Drilling Conference and Exhibition, Amerstdam, The Netherlands, Mar. 17-19, 2009, pp. 1-12.
Bordakov, G. A., et al., "Improving LWD Image and Formation Evaluation by Using Dynamically Corrected Drilling-Derived LWD Depth and Continuous Inclination and Azimuth Measurements", SPE Reservoir Evaluation & Engineering, Feb. 2009, pp. 137-148.
Sugiura, J. and Jones, S., "The Use of the Industry's First 3-D Mechanical Caliper Image While Drilling Leads to Optimized Rotary-Steerable Assemblies in Push- and Point-the-Bit Configurations", 2008 SPE Annual Technical Conference and Exhibition, Denver, Colorado, USA, Sep. 21-24, 2008, Socieity of Petroleum Engineers, 2008, pp. 1-12.
Menand S. et al., "Buckling of Tubulars in Actual Field Conditions," 2006 SPE Annual Technical Conference and Exhibition, San Antonio, Texas, USA, Sep. 24-27, 2006, Society of Petroleum Engineers, 2006, pp. 1-13.
Mason, C.J., "The Wellbore Quality Scorecard (WQS)", IADC/SPE Drilling Conference, Miami, Florida, USA, Feb. 21-23, 2006, pp. 1-14.
Sawaryn, S.J. and Thorogood, J.L., "A Compendium of Directional Calculations Based on the Minimum Curvature Method", SPE Drilling & Completion, Mar. 2005, pp. 24-36.
Samuel, G.R. and Bharucha, K., "Tortuosity Factors for Highly Tortuous Wells: A Practical Approach", SPE/IADC Drilling Conference, Amsterdam, The Netherlands, Feb. 23-25, 2005, Society of Petroleum Engineers, 2005, pp. 1-6.
Liu, X., et al., "New Techniques Improve Well Planning and Survey Calculation for Rotary-Steerable Drilling", IADC/SPE Asia Pacific Drilling Technology Conference and Exhibition, Kuala Lumpur, Malaysia, Sep. 13-15, 2004, Society of Petroluem Engineers, 2004, pp. 1-8.
Bullitt, E., et al., "Measuring Tortuosity of the Intracerebral Vasculature from MRA Images", IEEE Trans Med Imaging, vol. 22, Issue 9, Sep. 2003, pp. 1163-1171.
Stuart, D., et al., "New Drilling Technology Reduces Torque and Drag by Drilling a Smooth and Straight Wellbore", SPE/IADC Drilling Conference, Amsterdam, The Netherlands, Feb. 19-21, 2003, Society of Petroleum Engineers, 2003, pp. 1-12.
Skillingstad, T., "At-Bit Inclination Measurements Improves Directional Drilling Efficiency and Control", 2000 IADC/SPE Drilling Conference, New Orleans, Louisiana, USA, Feb. 23-25, 2000, Society of Petroleum Engineers, 2000, pp. 1-7.
Matthews, C.M. and Dunn, L.J., "Drilling and Production Practices to Mitigate Sucker-Rod/Tubing-Wear-Related Failures in Directional Wells", SPE Production & Facilities, Nov. 1993, pp. 251-259.
Davis, J.C., "Statistics and Data Analysis in Geology, Second Edition", John Wiley & Sons, 1986, pp. 527-537.
American Petroleum Institute, "Bulletin on Directional Drilling Survey Calculation Methods and Terminology", API Bulletin D20, First Edition, Dec. 31, 1985, Washington, D.C., pp. 1-31.
Bang, J., et al., "Analysis and Quantification of Wellbore Tortuosity", 2016 SPE Production & Operations, pp. 1-10.
Ifeachor, E.G. and Jervis, B.W., "Digital Signal Processing. A Practical Approach", Harlow, England, Addison-Wesley, 1993, Chapter 2.
PCT International Search Report and Written Opinion; PCT/US2018/053177; dated Jan. 28, 2019.
Johancsik, et al.; Torque and Drag in Directional Wells—Prediction and Measurement; Journal of Petroleum Technology; SPE; Jun. 1984. DOI: 10.2118111380-PA.

\* cited by examiner

SYSTEM AND METHOD FOR ANALYZING WELLBORE SURVEY DATA TO DETERMINE TORTUOSITY OF THE WELLBORE USING DISPLACEMENTS OF THE WELLBORE PATH FROM REFERENCE LINES

CLAIM OF PRIORITY

This application claims the benefit of priority to U.S. Provisional Appl. No. 61/943,205, filed Feb. 21, 2014, U.S. Provisional Appl. No. 62/050,019, filed Sep. 12, 2014, and U.S. Provisional Appl. No. 62/085,035, filed Nov. 26, 2014, each of which is incorporated in its entirety by reference herein. This application is also generally related to U.S. patent application Ser. No. 14/612,168, filed on Feb. 2, 2015, titled "System and Method for Analyzing Wellbore Survey Data to Determine Tortuosity of the Wellbore Using Tortuosity Parameter Values," which also claims the benefit of priority to these U.S. provisional applications.

BACKGROUND

Field

This application relates generally to analysis of wellbore survey data and more particularly, to systems and methods for determining a tortuosity of a portion of the wellbore by analyzing the wellbore survey data.

Description of the Related Art

The deviation of a wellbore path or trajectory from a smooth curve (e.g., the predetermined plan for the wellbore path) is commonly referred to as tortuosity of the wellbore path. Large variations of the wellbore path over short distances (e.g., 10 to 30 meters) in a portion of the wellbore can give rise to problems in setting casings in the portion of the wellbore, passing casings through the portion of the wellbore, in the installation of production equipment (e.g., electric submersible pumps or rod-driven mechanical pumps) in the portion of the wellbore, and/or passing production equipment through the portion of the wellbore.

SUMMARY

Certain embodiments described herein provide a method for providing information regarding the tortuosity of a wellbore path. The method comprises receiving data from a plurality of survey stations of a wellbore survey. The method further comprises defining a plurality of reference lines for the wellbore path. The method further comprises determining a plurality of displacements of the wellbore path from the plurality of reference lines.

Certain embodiments described herein provide a computer system for providing information regarding the tortuosity of a wellbore path. The computer system comprises a memory and a processor. The processor is configured to receive data from a plurality of survey stations of a wellbore survey. The processor is further configured to define a plurality of reference lines for the wellbore path. The processor is further configured to determine a plurality of displacements of the wellbore path from the plurality of reference lines.

Certain embodiments described herein provide a tangible computer-readable medium having instructions stored thereon which instruct a computer system to provide information regarding the tortuosity of a wellbore path by at least: receiving data from a plurality of survey stations of a wellbore survey, defining a plurality of reference lines for the wellbore path, and determining a plurality of displacements of the wellbore path from the plurality of reference lines.

BRIEF DESCRIPTION OF THE DRAWINGS

Various configurations are depicted in the accompanying drawings for illustrative purposes, and should in no way be interpreted as limiting the scope of the systems or methods described herein. In addition, various features of different disclosed configurations can be combined with one another to form additional configurations, which are part of this disclosure. Any feature or structure can be removed, altered, or omitted. Throughout the drawings, reference numbers may be reused to indicate correspondence between reference elements.

DETAILED DESCRIPTION

Figure 1:
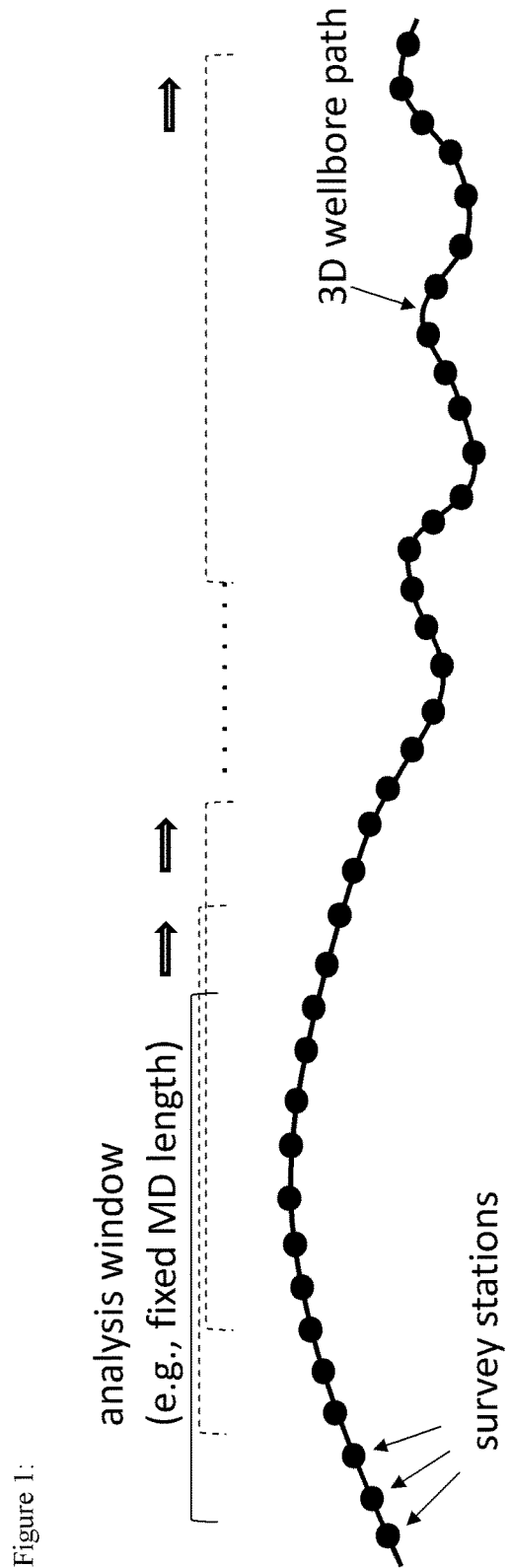
FIG. 1 schematically illustrates a portion of an example wellbore path in accordance with certain embodiments described herein.

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order-dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein.

Information regarding the tortuosity of a newly-drilled wellbore can be helpful in avoiding installing production equipment in portions of the wellbore having high tortuosity. In addition, information regarding the tortuosity may be used to analyze the performance of different drilling methods (e.g., using rotary steerable tools or bent subs) in different formations.

It can be advantageous to drill wellbores with low tortuosity (e.g., wellbores with smooth wellbore trajectories; wellbores with minimal short-scale variation in the wellbore path) that are consistent with the predetermined wellbore plan. It can also be advantageous to place production equipment in portions of the wellbore having low tortuosity. Since a rigid item of equipment may not be able to pass through and/or reside in a wellbore section having too great a curvature, information regarding the tortuosity of the wellbore section can be advantageously used (e.g., along with the diameter of the wellbore section) to determine equipment dimensions (e.g., maximum diameter of a rigid pipe or rod of length L; maximum length of a rigid pipe or rod of diameter D) that may be expected to pass through and/or reside in the wellbore section.

Current systems and methods seeking to provide information regarding the tortuosity of the wellbore path utilize the measured dogleg of the wellbore (e.g., bending of the survey tool when the survey tool is at various positions, such as survey stations, along the wellbore path, or changes in wellbore attitude analyzed from directional survey data). However, information from dogleg curves is, in general, difficult to use, for several reasons: (a) if the dogleg is calculated from survey data obtained at long intervals of measured depth ("MD"), the results can lack sufficient detail; (b) if the dogleg is calculated from survey data obtained at short MD intervals, the results can in general be noisy; (c) it can be difficult to upgrade from dogleg values over short intervals to meaningful dogleg values over longer intervals, by for example averaging techniques.

Certain embodiments described herein advantageously provide systems and methods that provide quantification of the tortuosity of the wellbore path that are not as affected by noise and are easier to use. Certain embodiments described herein advantageously provide systems and methods for evaluating the tortuosity of portions of the wellbore using wellbore survey data. Examples of wellbore survey data in accordance with certain embodiments described herein include, but are not limited to: continuous gyroscopic survey data; gyroscopic survey data with a relatively small depth interval between successive surveys, for example, one foot; other survey data with sufficiently high spatial resolution along the wellbore (e.g., with sufficiently frequent or short depth intervals), for example, from inclinometers, accelerometers, measurement-while-drilling (MWD) magnetic instruments, inertial instruments. Certain embodiments described herein provide a system and method of analyzing wellbore survey data and generating information regarding the wellbore tortuosity that can be displayed in an effective and useful manner. The tortuosity can be presented in a manner that allows decisions to be made about where to install equipment in the wellbore after the wellbore has been created. In certain embodiments, a method that is implemented on a computer can be used to analyze and present wellbore tortuosity information to a user to make vital decisions about the development of a well.

For example, the tortuosity information can be helpful in determining where to place one or more pumps in the wellbore. The placement of a pump in a wellbore section having a relatively high tortuosity can reduce the lifetime of the pump dramatically. If installed in a higher-tortuosity section of the wellbore, the pump may be subject to a bending moment due to the shape of the wellbore restricting the ability of the pump rotor to turn freely (e.g., as a result of excess pressure on the bearings or sliding contact between the rotor and the outer casing of the pump), causing the pump to wear out sooner than had the pump been installed in a lower-tortuosity section of the wellbore.

FIG. 1 schematically illustrates a portion of an example wellbore path in accordance with certain embodiments described herein. The example wellbore path of FIG. 1 has a lower tortuosity on the left side of the illustrated portion of the wellbore path and a higher tortuosity on the right side of the illustrated portion of the wellbore path. The wellbore path typically is a three-dimensional trajectory, which FIG. 1 illustrates in two dimensions. The solid circles along the wellbore path represent survey stations at which survey data of the wellbore trajectory have been measured. At each of the survey stations, the three-dimensional coordinates of the wellbore path can be measured and expressed, for example, in terms of the parameters of measured depth (MD), inclination (Inc), and azimuth (Az), or in terms of the spatial position parameters north (N), east (E), and vertical (V). In certain embodiments, the spacings between adjacent survey stations along the wellbore are on the order of one foot (e.g., spacings in a range of one foot to five feet; spacings of one foot or less). In certain embodiments, survey data measured in (MD, Inc, Az) can be converted into (N, E, V) to enable calculation of distances in NEV space, while in certain other embodiments, conversion of survey data from (N, E, V) into (MD, Inc, Az) may be performed. In certain embodiments, the spacings are substantially equal to one another (e.g., the survey stations are substantially equidistant from one another along a parameter such as MD), while in certain other embodiments, the spacings vary from one another (e.g., the survey stations are not substantially equidistant from one another along a parameter such as MD).

As schematically illustrated in FIG. 1, an analysis window may be used in the analysis of the wellbore survey data, and the tortuosity of the portion of the wellbore path within the analysis window may be generated. In certain embodiments, the analysis window includes the data from survey stations within a predetermined MD length (e.g., a fixed MD length). In certain other embodiments, the analysis window includes the data from survey stations within a predetermined number of survey stations along the wellbore path. The analysis window can be sequentially set (e.g., moved or slid) along the wellbore path such that the tortuosity of subsequent portions of the wellbore path is calculated sequentially to provide a measure of the tortuosity of the wellbore path. For example, the analysis window can be moved by one survey station between successive calculations, or the analysis window can be moved by two or more survey stations between successive calculations. By setting the analysis window at sequential positions along the wellbore path, the tortuosity of the wellbore path at these positions can be compared to evaluate which portions of the wellbore path have higher tortuosities than others.

In the discussion below, multiple techniques are described for providing information regarding the tortuosity of the wellbore path in accordance with certain embodiments described herein. In certain embodiments, these techniques may be used separately from one another, while in certain other embodiments, two or more of these techniques may be used in conjunction with one another. For example, the data may be pre-processed using one or more of the techniques described below, and then further processed by one or more other techniques of the techniques described below. Such pre-processing may advantageously facilitate the separation of tortuosity from other effects, such as large-scale wellbore curvature. In certain embodiments, two or more of these techniques may be used in conjunction with one another in one sequence or order, while in certain other embodiments, the two or more techniques may be used in conjunction with one another in another sequence or order. The techniques can also be used iteratively, e.g., repeated application of one or more techniques in any conjunction or sequence, for gradual refinement of the results.

Spectral Analysis Technique

Figure 2A:
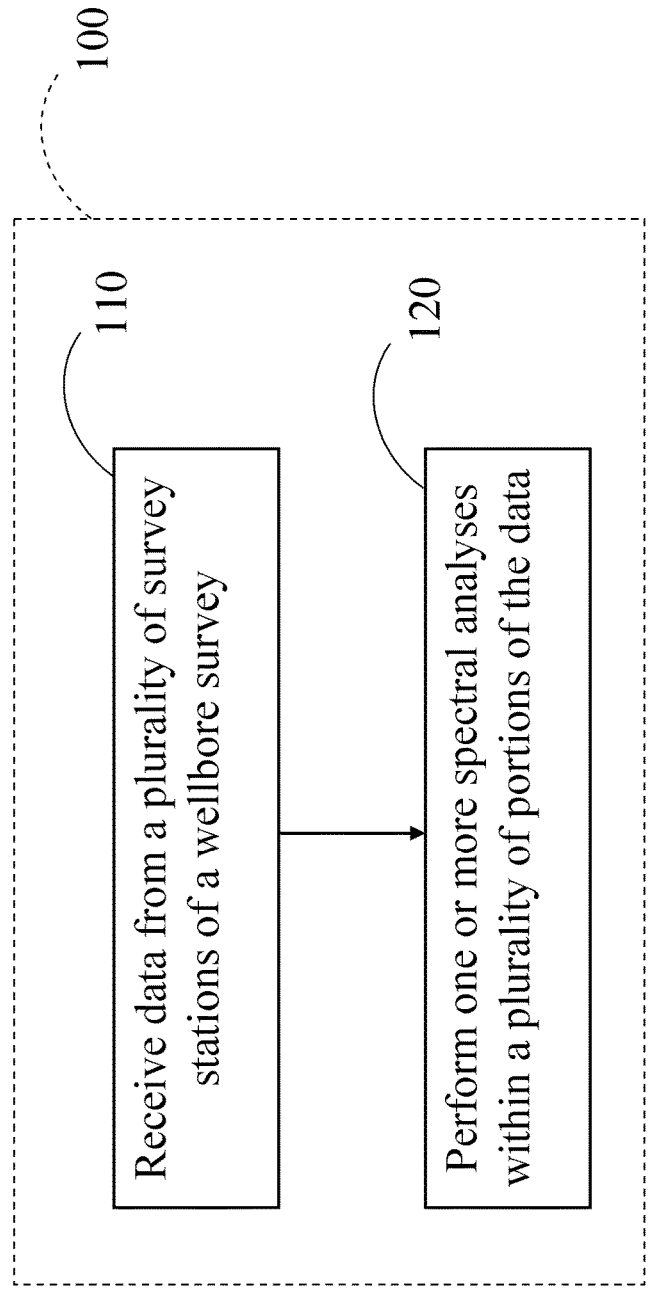
FIG. 2A is a flow diagram of an example method for providing information regarding the tortuosity of the wellbore path in accordance with certain embodiments described herein.
Figure 2D:
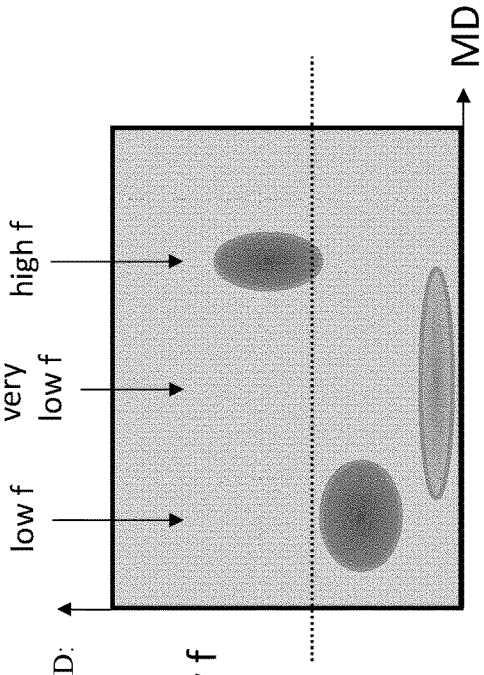
FIGS. 2B-2D schematically illustrate the example technique of FIG. 2A.
Figure 2C:
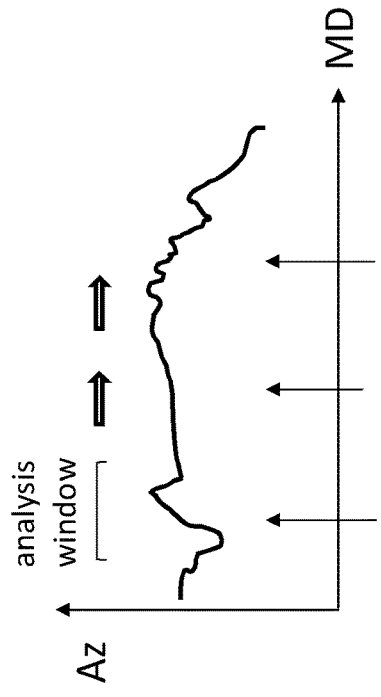
Figure 2B:
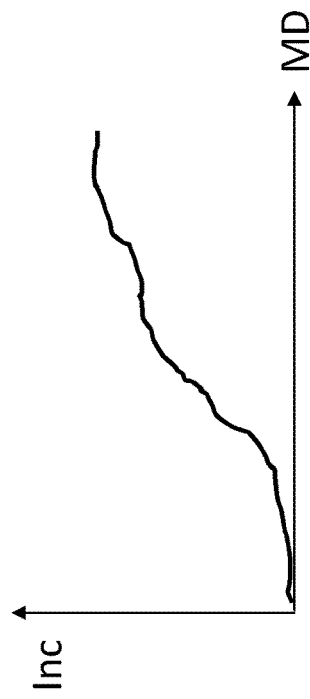

FIG. 2A is a flow diagram of an example method 100 for providing information regarding the tortuosity of the wellbore path in accordance with certain embodiments described herein, and FIGS. 2B-2D schematically illustrate the example technique of FIG. 2A. In certain embodiments, the method 100 provides a spectral analysis technique which allows information to be gathered about the relative distances over which significant variations in well orientation occur.

The method 100 comprises receiving data from a plurality of survey stations of a wellbore survey in an operational block 110. The data includes information regarding at least one first parameter of the wellbore path as a function of at least one second parameter of the wellbore path. For example, the data can include information regarding the inclination (Inc) of the wellbore path as a function of the measured depth (MD) of the wellbore path, a schematic example of which is plotted in FIG. 2B. For another example, the data can include information regarding the azimuth (Az) of the wellbore path as a function of the measured depth (MD) of the wellbore path, a schematic example of which is plotted in FIG. 2C. The data can be generated during a wellbore survey with high spatial resolution (e.g., a survey with a short spacing between sequential survey stations, for example, less than 30 meters, less than 10 meters, less than 1 meter, less than 0.5 meter, less than 0.3 meter, less than 0.1 meter). Such high spatial resolution data can be used to analyze small-scale wellbore curvature (e.g., having a measured depth in a range between 1 meter to 100 meters). In certain embodiments, receiving the data comprises generating the data by running a wellbore survey tool within the wellbore.

The method 100 further comprises performing one or more spectral analyses within a plurality of portions of the data in an operational block 120. For example, as schematically illustrated in FIG. 2C, an analysis window can denote a portion of the data (e.g., a portion of the wellbore corresponding to the portion of the data is defined by the analysis window) and the analysis window can be moved (e.g., slid) to denote different portions of the data (denoted in FIG. 2C by the horizontal arrows). The portions of the data can be sequential to one another along the second parameter, and two or more neighboring portions can overlap one another. For example, the analysis window can be moved between successive positions by a predetermined amount (e.g., one survey station) that is smaller than a width of the analysis window (e.g., 10 survey stations). For each portion of the data (e.g., for each position of the analysis window), a spectral analysis of the portion of the data within the analysis window can be performed. For example, a Fourier transform of the data within the analysis window can be calculated to generate a spatial frequency relative to the first parameter as a function of the second parameter. Any spectral transforms that are suited for analyzing spatial frequencies may be used in accordance with certain embodiments described herein. For each position of the analysis window (e.g., for each value of MD), a range of spectral frequencies relative to the Az curve within the analysis window can be generated (e.g., and stored and/or plotted). For example, a range of spectral frequencies and the relative magnitudes of the spectral frequencies within the range can be plotted as a function of the second parameter (e.g., MD) of the wellbore path, as schematically shown by FIG. 2D. The spectral shape and contents will vary as a function of the second parameter as the analysis window moves along the data, and the resultant information (e.g., presented numerically or as a two-dimensional plot as schematically shown in FIG. 2D), can be used to identify regions of interest in the data along the second parameter.

Portions of the data with very low spatial frequencies (e.g., in the center of FIG. 2D) can be indicative of low or very low tortuosity of the corresponding portions of the wellbore path (e.g., portions in which the wellbore path generally follows a smooth curve, such as the predetermined plan for the wellbore path). Other portions of the data with relatively low spatial frequencies (e.g., on the left side of FIG. 2D) can be indicative of low tortuosity of the corresponding portions of the wellbore path (e.g., portions in which the wellbore path generally follows a more tortuous curve of the predetermined plan for the wellbore path). Still other portions of the data with relatively high spatial frequencies (e.g., on the right side of FIG. 2D) can be indicative of high tortuosity of the corresponding portions of the wellbore path (e.g., portions in which the wellbore path is too tortuous for placement of equipment in the wellbore).

In certain embodiments, the resultant spatial frequency information can be used to identify regions of the survey data in which further analysis is to be performed or parameters to be used in further analysis (e.g., pre-processing before using one or more of the other techniques described herein). For example, a threshold level can be predetermined (e.g., the horizontal dotted line of FIG. 2D) to distinguish between spatial frequency distributions of low tortuosity (e.g., tortuosity of less concern and not warranting further analysis) and those of high tortuosity (e.g., tortuosity of more concern and warranting further analysis). In certain embodiments, the resultant spatial frequency information can be used to identify regions of the wellbore in which equipment (e.g., one or more pumps) are to be placed.

Displacement Technique

Figure 3A:
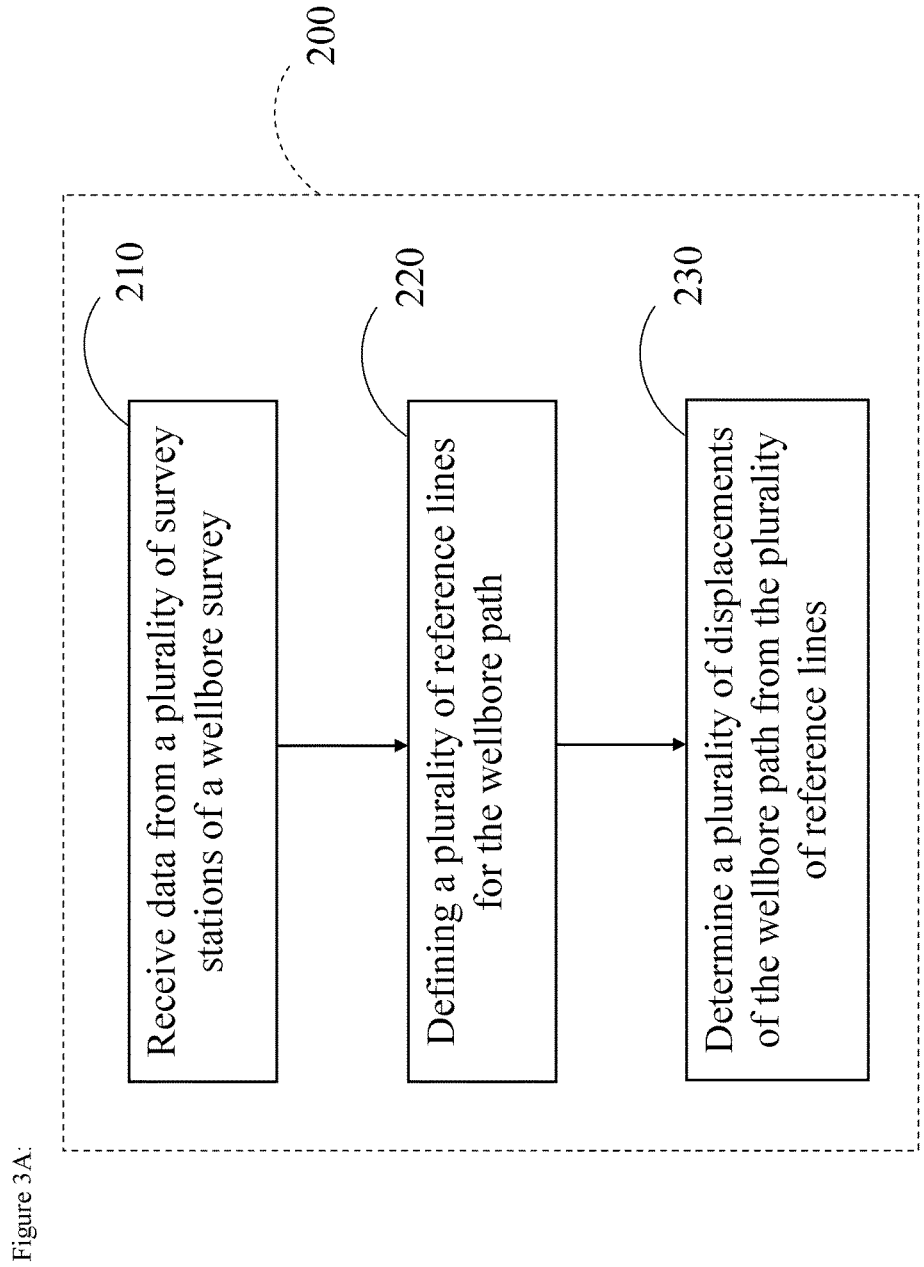
FIG. 3A is a flow diagram of an example method for providing information regarding the tortuosity of the wellbore path in accordance with certain embodiments described herein.
Figure 3B:
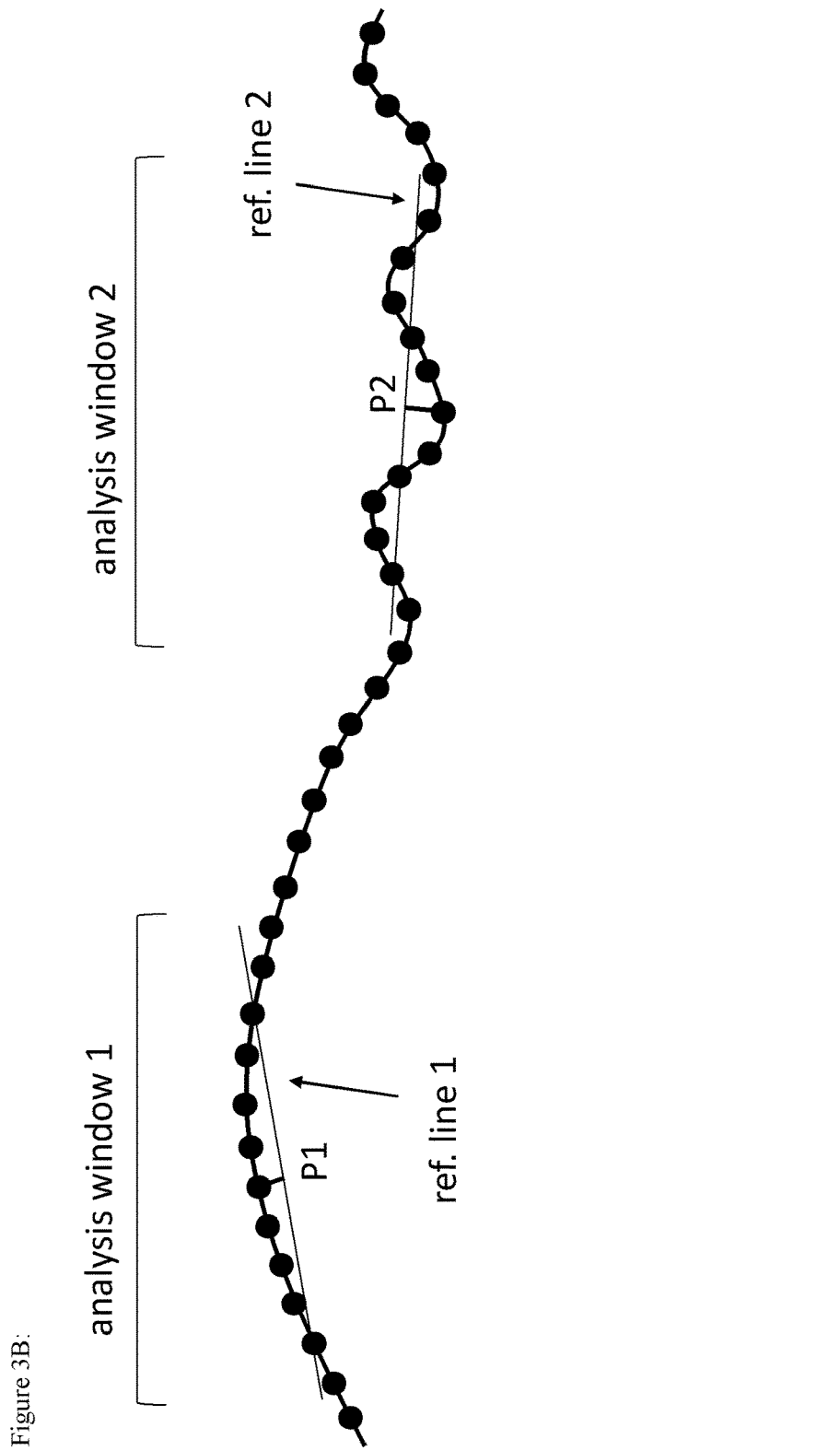
FIG. 3B schematically illustrates the example technique of FIG. 3A.

FIG. 3A is a flow diagram of an example method 200 for providing information regarding the tortuosity of the wellbore path in accordance with certain embodiments described herein, and FIG. 3B schematically illustrates the example technique of FIG. 3A. In certain embodiments, the method 200 provides an analysis based on the variation in inclination and azimuth at one or more positions within the portion of the wellbore. In certain other embodiments, the method 200 provides an analysis based on the variation in north, east, and vertical coordinates at one or more positions within the portion of the wellbore. In certain embodiments, the tortuosity of the wellbore path is determined by examining an analysis window (e.g., having a fixed length) as the analysis window is moved (e.g., slid) along the portion of the wellbore path. The length of the analysis window can be varied to determine the tortuosity over different lengths of the wellbore path. For example, the length of the analysis window can be selected to be equal to the length of a physical device to be inserted into the wellbore, or the length of the analysis window can be selected based on the spatial frequency estimates (e.g., equal to a threshold line value between high frequency and low frequency values from the spatial frequency plot of the spectral analysis technique described herein).

The method 200 comprises receiving data from a plurality of survey stations of a wellbore survey in an operational block 210. The data includes information regarding a position of the wellbore path at each survey station of the plurality of survey stations. For example, the data can include information regarding the inclination (Inc), the azimuth (Az), and the measured depth (MD) of the wellbore path at each survey station of the plurality of survey stations (e.g., the plurality of survey stations that are to be analyzed). For another example, the data can include information regarding the north, east, and vertical coordinates of the wellbore path at each survey station of the plurality of survey stations (e.g., the plurality of survey stations that are to be analyzed). The data can be generated during a wellbore survey with high spatial resolution (e.g., a survey with a short spacing between sequential survey stations, for example, less than 30 meters, less than 10 meters, less than 1 meter, less than 0.5 meter, less than 0.3 meter, less than 0.1 meter). Such high spatial resolution data can be used to analyze small-scale wellbore curvature (e.g., having a measured depth in a range between 1 meter to 100 meters). In certain embodiments, receiving the data comprises generating the data by running a wellbore survey tool within the wellbore.

The method 200 further comprises defining a plurality of reference lines for the wellbore path within a corresponding plurality of analysis windows in an operational block 220. For example, as schematically illustrated in FIG. 3B, an analysis window can be defined to denote a corresponding portion of the data and the analysis window can be moved (e.g., slid) to denote different portions of the data. The portions of the data can be sequential to one another, and two or more neighboring portions can overlap one another. For example, the analysis window can be moved between successive positions by a predetermined amount (e.g., one survey station) that is smaller than the width of the analysis window (e.g., 10 survey stations).

For each portion of the data (e.g., for each position of the analysis window), a reference line in three-dimensional ("3D") space can be defined within the analysis window based on two or more survey stations within the analysis window. FIG. 3B schematically illustrates a reference line ("ref line 1") for "analysis window 1" and a reference line ("ref line 2") for "analysis window 2". Examples of reference lines that are compatible with certain embodiments described herein include, but are not limited to:

a straight reference line defined by the positions of the first and last survey stations of the analysis window;

a straight reference line defined by the weighted best fit of the positions of the survey stations of the analysis window to a straight line (e.g., the weighted best first-order fit);

a curved reference line defined by the weighted best fit of the positions of the survey stations of the analysis window to a curved line (e.g., the weighted best higher-order fit);

a curved reference line resulting from spatial low-pass filtering of one or more of the parameters Inc, Az, N, E, V, as a function of MD.

an iteratively derived line which is derived by calculating deviations of the wellbore path from an initial reference line (e.g., straight or curved), updating station positions with these deviations (e.g., either fully or partially) to bring them closer to the reference line, where repetition of this procedure will gradually smooth the curve with the final smoothed curve serving as the reference line.

In certain embodiments, the reference line resulting from the processing described above can be used to modify the original wellbore path (e.g., by subtraction) to retain only the higher spatial frequency (e.g., small-scale) variations.

The method 200 further comprises determining a plurality of displacements in 3D space of the wellbore path from the plurality of reference lines within the plurality of analysis windows in an operational block 230. For each analysis window, a displacement of the wellbore path can be determined at one or more predetermined positions within the analysis window (e.g., at a survey station in the center of the analysis window, as shown schematically in FIG. 3B). The displacement (e.g., labeled "P1" for "Analysis window 1" and "P2" for "Analysis window 2") can comprise a direction and a magnitude of the displacement vector (e.g., a vector that is perpendicular to the reference line and that points to the position of the survey station at which the displacement is determined). In certain embodiments, the displacements can be calculated directly from wellbore data (e.g., Inc, Az, N, E, V) that have been high-pass filtered with respect to spatial frequency along MD. The high-pass filtering can remove the low-spatial-frequency components that constitute the reference line or reference curve discussed above. In certain other embodiments, the displacement vector can be calculated from a vector that projects the survey station onto the reference line, or from a vector that connects the survey station and the midpoint of the reference line, or from a vector that connects the survey station and the middle position of the set of survey stations used to find the reference line.

Portions of the data in which the displacement has relatively small magnitude or varies slowly along the wellbore (e.g., slowly with measured depth, as in the region of the wellbore near "analysis window 1" of FIG. 3B) can be indicative of lower tortuosity of the corresponding portions of the wellbore path (e.g., portions in which the wellbore path generally follows the predetermined plan for the wellbore path). Still other portions of the data in which the displacement has greater magnitude or varies more rapidly along the wellbore (e.g., more rapidly with measured depth, as in the regions of the wellbore near "analysis window 2" of FIG. 3B) can be indicative of high tortuosity of the corresponding portions of the wellbore path (e.g., portions in which the wellbore path is too tortuous for placement of equipment in the wellbore).

In certain embodiments, the displacements found by this technique can be subtracted (e.g., fully or partially) from the wellbore path to generate a smoothed wellbore curve (e.g., in a single step or in an iterative procedure), or the displacements can be used to establish a smoothed wellbore curve via curve-fitting. In certain embodiments, subtracting the smoothed wellbore curve from the wellbore path can illustrate only the high-frequency (e.g., small scale) variations of the wellbore path. One or more of the techniques described herein can then be applied to the resulting data having these high-frequency variations.

In certain embodiments, the displacements can be calculated directly on at least one of the inclination data and the azimuth data, and can be used to generate a smoothed wellbore curve. In certain embodiments, the data can advantageously be converted to NEV space prior to the smoothing procedure, since in NEV space, the displacements are true displacements, not mere angular dimensions.

Contact Points

In certain embodiments, the information regarding the tortuosity of the wellbore path can be expressed as a series of potential points of contact between an elongate structure within the wellbore and an inner surface of the wellbore (e.g., points at which the elongate structure can potentially contact the inner surface of the wellbore due to the tortuosity of the wellbore path). For example, the elongate structure can comprise a rod, a portion of a rod, a rod guide, or a portion of a rod guide used as part of a wellbore pumping system.

The rod or rod guide can be configured to be used as part of a wellbore pumping system. For example, a beam pumping system can utilize a rod which is configured to be mechanically coupled to a downhole pump and to an aboveground drive unit. In a reciprocating rod lift (RRL) pumping system (e.g., an artificial lift configuration), the rod can be referred to as a "sucker rod" and the drive unit can be configured to move the sucker rod axially (e.g., up and down) within the wellbore to actuate the downhole pump. The sucker rod can comprise a plurality of rod portions that are coupled (e.g., jointed) to one another (e.g., by threaded ends). A variety of types of sucker rods can be used (e.g., API, non-API, hollow, fiberglass, fiber-reinforced plastic, high strength) and the rod portions can have a variety of lengths, diameters, and tensile strengths. In a progressing cavity pumping (PCP) system (sometimes referred to as a progressive cavity pumping system), the rod rotates, rather than moving axially, to apply movement to the downhole pump.

Where the rod comes into contact with an inner surface of the wellbore (e.g., an inner wall of a wellbore casing or other tubular structure within the wellbore), the rod can be subject to bending moments and wear. In certain such instances, one or more rod guides or rod guide portions can be inserted at appropriate locations within the wellbore to allow the rod to move smoothly within the wellbore and to reduce wear. In addition, the bending moments can be quantified and compared to the rod manufacturer's specifications to give forewarning of possible problems with the rods. Certain embodiments described herein can be used to determine locations of potential contact points between the rod and the inner surface of the wellbore and hence, where to install one or more rod guides.

FIGS. 4A-4E schematically illustrate an example procedure for determining potential contact points of an elongate structure (e.g., a rod, a rod guide, or a portion thereof) within the wellbore with an inner surface of the wellbore in accordance with certain embodiments described herein. The potential contact points can be points at which the elongate portion is estimated to contact the inner surface of the wellbore. The example procedure of FIGS. 4A-4E can be considered an example of the method 200 illustrated in FIG. 3A. For example, using the data provided from the plurality of survey stations of a wellbore survey (e.g., in the operational block 210 of the method 200), a plurality of reference lines for the wellbore path within a corresponding plurality of analysis windows can be defined (e.g., in the operational block 220 of the method 200), and a plurality of displacements of the wellbore path from the plurality of reference lines can be determined (e.g., in the operational block 230 of the method 200).

Figure 4A:
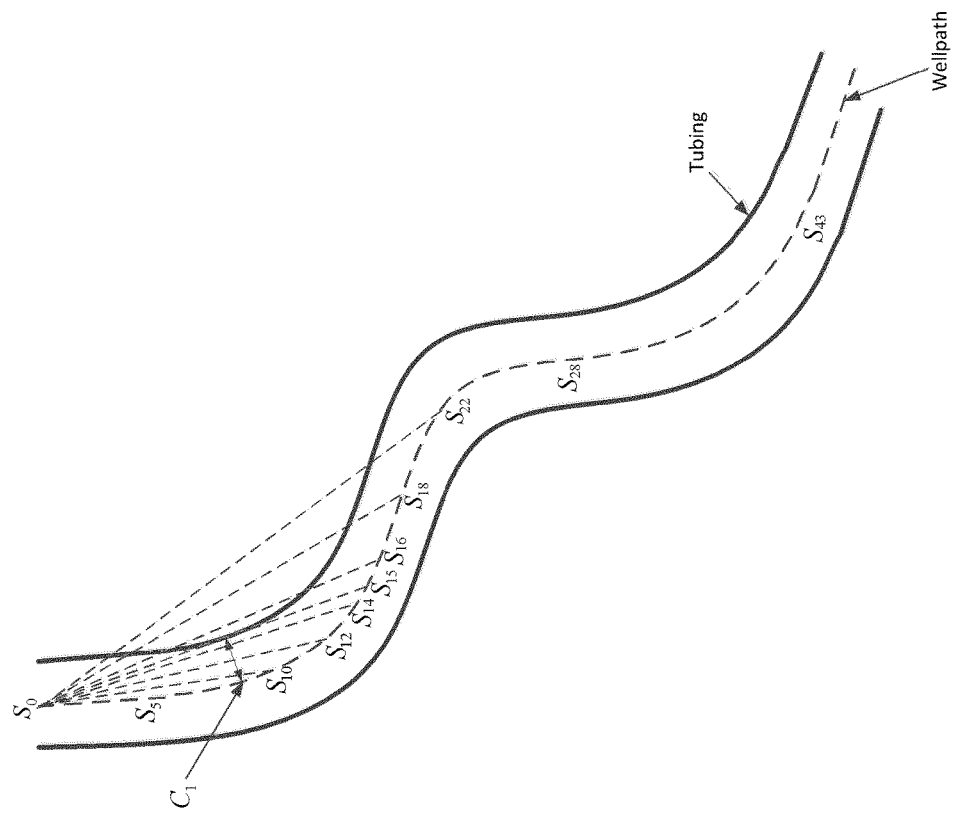
FIGS. 4A-4E schematically illustrate an example procedure for determining potential contact points of an elongate structure within the wellbore with an inner surface of the wellbore in accordance with certain embodiments described herein.

FIG. 4A schematically illustrates an example of defining a reference line in accordance with certain embodiments described herein. The wellbore comprises a center line, referred to in FIG. 4A as a wellpath, which can be defined using the data provided from the plurality of survey stations. A boundary defining a volume within the wellbore in which equipment can travel can be defined using the data provided from the plurality of survey stations and known physical dimensions (e.g., inner radius of the wellbore, inner radius of wellbore casings). FIG. 4A also shows a series of survey stations $S_0, \ldots, S_n$ along the wellpath. Only some of the survey stations (e.g., $S_0$, $S_5$, $S_{10}$, $S_{12}$, $S_{14}$, $S_{15}$, $S_{16}$, $S_{18}$, $S_{22}$, $S_{28}$, $S_{43}$) are shown explicitly in FIG. 4A for clarity. By applying the reference line and displacement processing method described herein, a first reference line can be defined as the longest line which extends from the survey station $S_0$ to a subsequent survey station, and does not extend past the boundary (e.g., defined by the inner radius $r_{wc}$ of the wellbore casing surrounding the wellpath) defining the volume within the wellbore in which equipment can travel. For example, the first reference line can be defined as the longest line extending from the survey station $S_0$ to a subsequent survey station (e.g., $S_1, S_2, S_3, \ldots, S_n$) that does not extend past the inner wall of the wellbore casing. More generally, a reference line corresponding to a survey station $S_n$ can be defined as the longest line which extends from the survey station $S_n$ to a subsequent survey station, and does not extend past the boundary defining the volume within the wellbore in which equipment can travel.

Such a reference line can be found by defining a plurality of candidate reference lines as straight lines between the survey station (e.g., $S_0$) and a number N of subsequent survey stations (e.g., $S_i$ where i=1 . . . N, with N being user-defined). The plurality of N candidate reference lines for the survey station $S_0$ can be referred to as $S_0S_1$, $S_0S_2, \ldots, S_0S_i, \ldots S_0S_N$. For each candidate reference line, the transverse displacements of the candidate reference line from each survey station between the two survey stations at the two ends of the candidate reference line can be determined. For example, for the candidate reference line $S_0S_{22}$, the transverse displacements of the candidate reference line $S_0S_{22}$ can be determined at each survey station $S_1, \ldots, S_{21}$. Still for each candidate reference line, the maximum transverse displacement of the candidate reference line from each survey station can be determined and compared to the boundary defining the volume within the wellbore in which equipment can travel (e.g., compared to an inner radius of the wellbore or of the casing or tubing within the wellbore, perhaps corrected for the finite diameter of the rod or internal tubing). For example, if the maximum transverse displacement of the candidate reference line is less than the inner radius, then the candidate reference line lies wholly inside the volume. If the maximum transverse displacement of the candidate reference line is greater than the inner radius, then the candidate reference line extends outside the volume. If the maximum transverse displacement of the candidate reference line is equal to the inner radius, then the candidate reference line touches the boundary of the volume. Based on such comparisons, the reference line corresponding to the survey station can be selected.

As shown in FIG. 4A, for the survey station $S_0$, the line $S_0S_{14}$ lies wholly within the wellbore casing (e.g., does not touch or extend past the inner wall of the wellbore casing), while the line $S_0S_{15}$ touches and does not extend past the wellbore casing (e.g., touches and does not extend past the inner wall of the wellbore casing), and each of the subsequent lines (e.g., $S_0S_{16}$, $S_0S_{18}$, and $S_0S_{22}$) extends past the inner wall of the wellbore casing. The reference line corresponding to the survey station $S_n$ can be defined to be the line $S_nS_j$ for which it and all "previous" lines (e.g., $S_nS_k$ (with k=n+1, . . . , j) do not extend past the boundary defining the volume within the wellbore in which equipment can travel, and the "next" line $S_nS_{j+1}$ does extend past the boundary. Using this definition in the example of FIG. 4A, the reference line corresponding to the survey station $S_0$ (e.g., the first reference line) is the line $S_0S_{15}$, since this line and all "previous" lines $S_0S_k$ (with k=1, . . . , 15) do not extend past the boundary defining the volume within the wellbore in which equipment can travel, and the "next" line $S_0S_{16}$ does extend past the boundary.

In certain other embodiments, the reference lines can be defined differently. For example, the reference line can be defined as being the longest line which extends from the corresponding survey station to a subsequent survey station, and does not touch or extend past the boundary. Using this alternative definition in the example of FIG. 4A, the first reference line would be the line $S_0S_{14}$ since this line is the longest line extending from the survey station $S_0$ to a subsequent survey station that does not touch or extend past the inner wall of the wellbore casing. For another example, the reference line can be defined as being the shortest line which extends from the corresponding survey station to a subsequent survey station, and which extends past the boundary. Using this alternative definition in the example of FIG. 4A, the first reference line would be the line $S_0S_{16}$ since this line is the shortest line extending from the survey station $S_0$ to a subsequent survey station that extends past the inner wall of the wellbore casing. For another example, the reference line can be defined as being the longest line which extends from the corresponding survey station to a subsequent survey station, and does not extend past the boundary. Thus, the reference line corresponding to the survey station $S_0$ (e.g., the first reference line) can be defined to be the line $S_0S_{15}$ since it is the longest line that extends from the survey station $S_0$ to a subsequent survey station and does not extend past the boundary defining the volume within the wellbore in which equipment can travel. Using this definition, it does not matter if there are any shorter lines which extend past the boundary. For another example, the reference line can be defined as being the "next" line after the longest line which extends from the corresponding survey station to a subsequent survey station, and does not extend past the boundary.

A maximum displacement $d_1$ of the wellbore path from the first reference line can be determined and the location $C_1$ of this maximum displacement $d_1$ can be determined and marked as an estimated location of a first contact point. For example, the maximum displacement $d_1$ of the wellbore path from the first reference line can be equal to the maximum distance between the wellbore path and the first reference line in a direction perpendicular to the first reference line, and the location along the wellbore path from which this maximum displacement $d_1$ is measured can be marked as the estimated location $C_1$ of the first contact point. The estimated location $C_1$ is at the location of a subsequent survey station to the survey station $S_0$ corresponding to the first references line, and this maximum displacement $d_1$ of the wellbore path is the maximum transverse displacement that was determined for selecting the first reference line, as described above. Using the example first reference line $S_0S_{15}$ shown in FIG. 4A, the maximum displacement $d_1$ is shown by the double-headed arrow and its location along the wellbore path is at the location labeled $C_1$. In certain embodiments, the location $C_1$ of the first contact point is taken to be the location of the closest survey station at which the maximum displacement $d_1$ occurs. For example, using the example first reference line $S_0S_{15}$ of FIG. 4A, the location $C_1$ of the first contact point can be taken to be the location of survey station $S_8$ (not shown).

Note that using each of the example definitions of the first reference line described above, the maximum displacements $d_1$ between the first reference line and the wellbore path are approximately equal to one another (e.g., approximately equal to the inner radius of the wellbore casing). Also, using each of the example definitions of the first reference line described above, the locations $C_1$ of the first contact point are approximately equal to one another.

To determine an estimated location of a second contact point $C_2$, a second reference line can be defined as the longest line which extends from the estimated location of the first contact point $C_1$ to a subsequent survey station (e.g., $S_9$, $S_{10}$, . . . , $S_n$), and that touches and does not extend past the boundary defining the volume within the wellbore in which equipment can travel. For example, using the example of FIG. 4A, the second reference line can be the line $C_1S_{28}$ since this line is the longest line which extends from the first contact point $C_1$ to a subsequent survey station (e.g., $S_{28}$), and that touches and does not extend past the boundary. While not shown in FIG. 4A, the line $C_1S_{27}$ lies wholly within the wellbore casing (e.g., does not touch or extend past the inner wall of the wellbore casing), and the line $C_1S_{29}$ extends past the inner wall of the wellbore casing. Thus, the second reference line is the line $C_1S_{28}$ since it extends from the estimated location of the first contact point $C_1$ to a subsequent survey station ($S_{28}$) and touches and does not extend past the boundary defining the volume within the wellbore in which equipment can travel.

As described above with regard to the first reference line, in certain other embodiments, the second reference line can be defined differently. For example, the second reference line can be defined as being the longest line which extends from the first contact point $C_1$ to a subsequent survey station, and does not touch or extend past the boundary (e.g., the line $C_1S_{27}$). For another example, the second reference line can be defined as being the shortest line which extends from the first contact point $C_1$ to a subsequent survey station, and which extends past the boundary (e.g., the line $C_1S_{29}$).

In a manner similar to that described above for determining the maximum displacement $d_1$, a maximum displacement $d_2$ of the wellbore path from the second reference line $C_1S_{28}$ (e.g., equal to the maximum distance between the wellbore path and the second reference line $C_1S_{28}$ in a direction perpendicular to the second reference line $C_1S_{28}$) can be determined and the location $C_2$ of this maximum displacement $d_2$ along the wellbore path can be determined and marked as an estimated location of a second contact point.

As described above with regard to the first reference line, in certain embodiments, the location $C_2$ of the second contact point is taken to be the location of the closest survey station at which the maximum displacement $d_2$ occurs. For example, using the example second reference line $C_1S_{28}$, the location $C_2$ of the second contact point can be taken to be the location of survey station $S_{23}$ (not shown). In certain other embodiments, the location $C_2$ of the second contact point is taken to be the actual location at which the maximum displacement $d_2$ occurs (e.g., at a location between two adjacent survey stations; at an interpolated location between two adjacent survey stations).

Figure 4B:
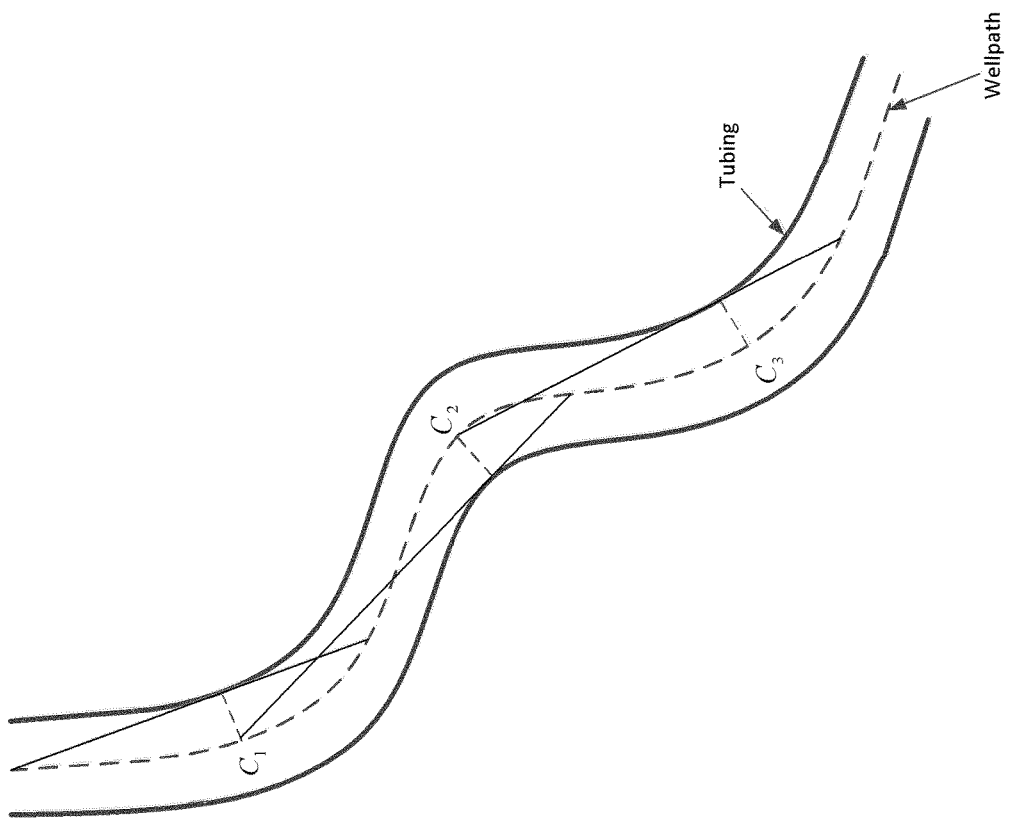

This procedure can be repeated for subsequent contact points, by defining subsequent reference lines similarly to the definitions of the first and second reference lines. The maximum displacements of the wellbore path from these subsequent reference lines can be determined similarly to the determinations of the maximum displacements described above and the locations of these maximum displacements can be determined similarly to the determinations of the locations described above and marked as estimated locations of the subsequent contact points. FIG. 4B schematically illustrates a series of reference lines and estimated locations of three contact points $C_1$, $C_2$, $C_3$ of the wellbore shown in FIG. 4A determined in accordance with certain embodiments described herein.

In the example embodiment described above, the reference lines are defined without accounting for the radius $r_{es}$ of the elongate structure. In certain other embodiments, the radius $r_{es}$ of the elongate structure can be taken into account by defining each reference line. For example, the reference lines can be defined as the longest lines which touch and do not extend past a boundary that surrounds the wellpath and that has an inner radius equal to the inner radius $r_{wc}$ of the wellbore casing minus the radius $r_{es}$ of the elongate structure. For another example, the reference lines can be defined as being the longest lines which do not touch or extend past the boundary that surrounds the wellpath and that has an inner radius equal to the inner radius $r_{wc}$ of the wellbore casing minus the radius $r_{es}$ of the elongate structure. For another example, the reference lines can be defined as being the shortest lines which extend past the boundary that surrounds the wellpath and that has an inner radius equal to the inner radius $r_{wc}$ of the wellbore casing minus the radius $r_{es}$ of the elongate structure.

Figure 4C:
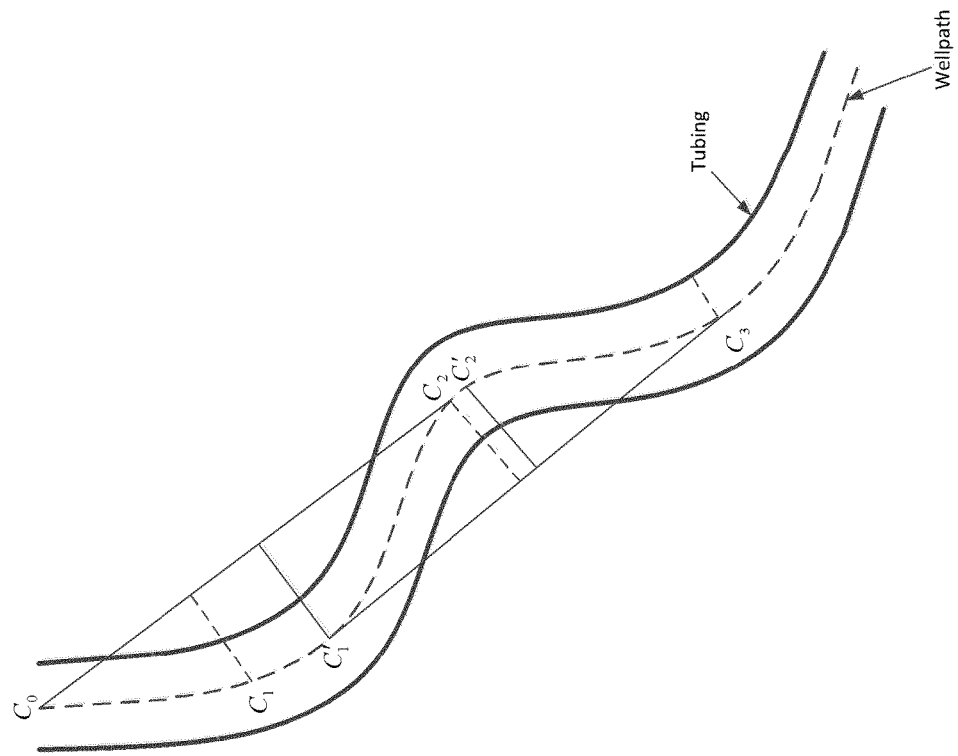

In certain embodiments, the estimated location of a contact point can be adjusted using an adjustment reference line defined using the other contact points. For example, FIG. 4C schematically illustrates a series of adjustment reference lines, each corresponding to a contact point $C_n$ and defined as extending from the previous contact point $C_{n-1}$ to the subsequent contact point $C_{n+1}$. The estimated location of each contact point $C_n$ can be moved from its initial estimated location to an adjusted estimated location $C'_n$ equal to the location of maximum displacement $d'_n$ of the reference line $C_{n-1}C_{n+1}$ from the wellpath. Such an adjustment procedure can result in large adjustments of some estimated contact point locations (e.g., $C'_1$) and smaller adjustments of other estimated contact point locations (e.g., $C'_2$). In certain embodiments, the initial estimated locations of a series of contact points $C_n$ can be determined, and then a corresponding series of adjusted estimated locations of the series of contact points $C'_n$ can be determined. For example, the initial estimated locations of a trio of adjacent contact points $C_{n-1}$, $C_n$, $C_{n+1}$ can be determined, and the adjusted estimated locations of the contact point $C'_n$ can be determined before proceeding to determine the subsequent adjusted estimated location of the contact point $C'_{n+1}$ using the subsequent trio of adjacent contact points $C_n$, $C_{n+1}$, $C_{n+2}$. In certain embodiments, an adjusted estimated location of a contact point $C'_n$ can be used to determine a subsequent adjusted estimated location of a contact point $C'_{n+1}$. For example, as shown in FIG. 4C, the initial estimated locations of the contact points $C_0$, $C_1$, $C_2$, $C_3$ can be determined as described above, and the initial estimated locations of the contact points $C_0$ and $C_2$ can be used to determine the adjusted estimated locations of the contact point $C'_1$, and the adjusted estimated location of the contact point $C'_1$ and the initial estimated location of the contact point $C_3$ can be used to determine the adjusted estimated location of the contact point $C'_2$.

Determining the initial estimated locations and the adjusted estimated locations can be performed in other orders as well in accordance with certain embodiments described herein. In addition, determining the adjusted estimated locations can be performed by iteration. For example, the iteration can include determining the initial estimated locations of some or all of the contact points $C_n$, determining first adjusted estimated locations of some or all of the contact points $C'_n$, and determining second adjusted estimated locations of some or all of the contact points $C''_n$ (e.g., using the first adjusted estimated locations of the contact points $C'_n$), etc. Such iterations can be performed to refine the adjusted estimated locations until a predetermined number of iterations is performed or until the difference between sequential iterations is less than a predetermined limit.

Figure 4D:
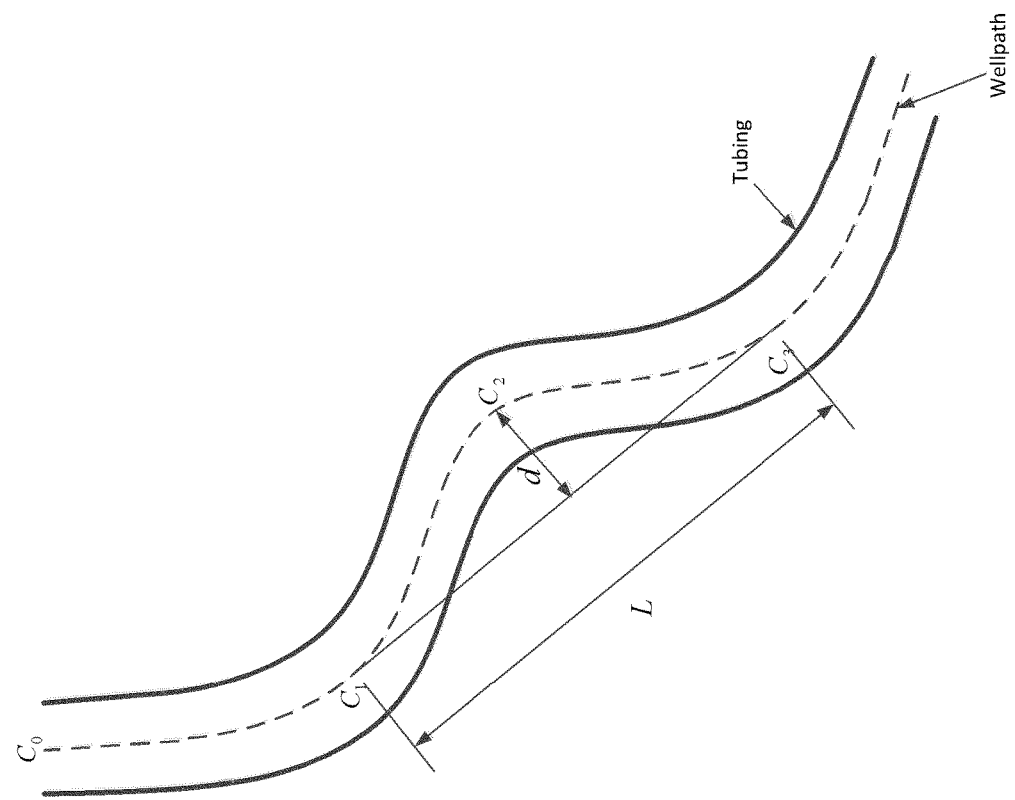

In certain embodiments, it is of interest to quantify the amount of curvature or bending of the elongate structure at a contact point within the wellbore. FIG. 4D schematically illustrates an example quantification of the degree of bend at a contact point in accordance with certain embodiments described herein. The length $L_{n-1,n+1}$ of the straight line $C_{n-1}C_{n+1}$ extending between contact point $C_{n-1}$ and contact point $C_{n+1}$ can be calculated and the maximum displacement $d_n$ of the contact point $C_n$ can also be calculated. A normalized displacement ($d_n/L_{n-1,n+1}$) equal to the maximum displacement $d_n$ divided by the length $L_{n-1,n+1}$ of the straight line can be calculated and used as a quantification of the degree of bend at the contact point $C_n$. If the adjustment procedure described above is used, the normalized displacement ($d'_n/L'_{n-1,n+1}$) can be calculated to be equal to the maximum displacement $d'_n$ of the adjusted contact point $C'_n$ from the line $C'_{n-1}C'_{n+1}$ divided by the length $L'_{n-1,n+1}$ of the line $C'_{n-1}C'_{n+1}$.

Figure 4E:
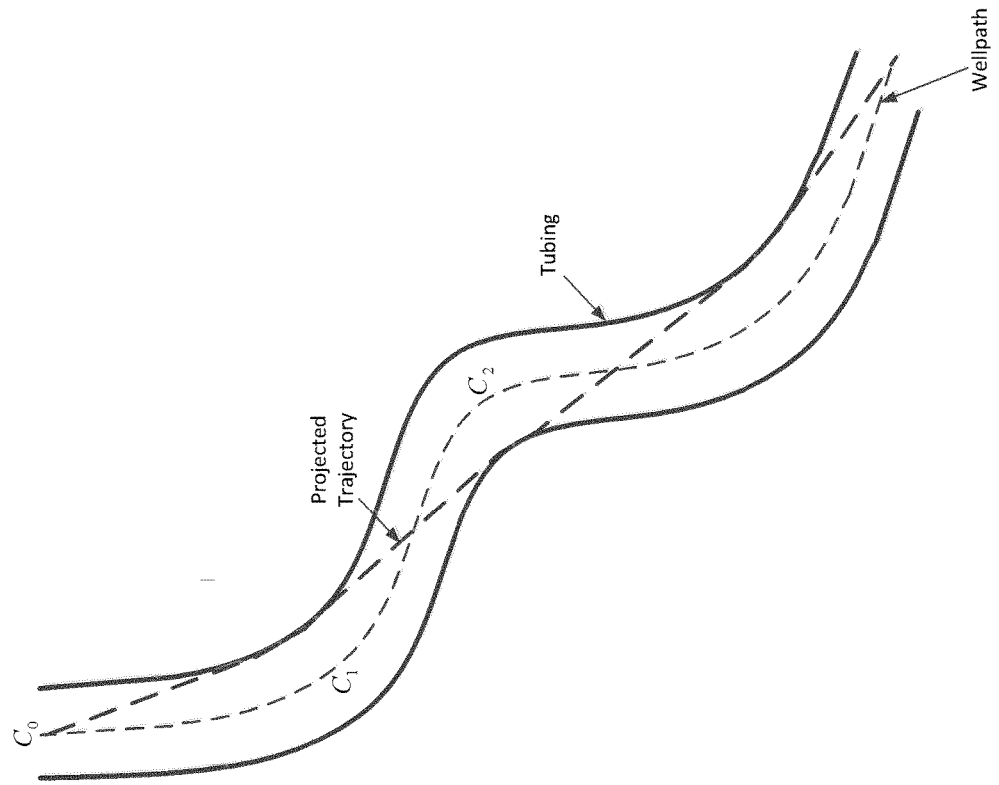

FIG. 4E schematically illustrates a projected trajectory of an elongate structure (e.g., a rod, a rod guide, or a portion thereof) in accordance with certain embodiments described herein. In certain embodiments, the projected trajectory can be used to show locations at which a rod guide is to be placed within the wellbore so as to provide protection of a rod from excessive wear.

Figure 5:
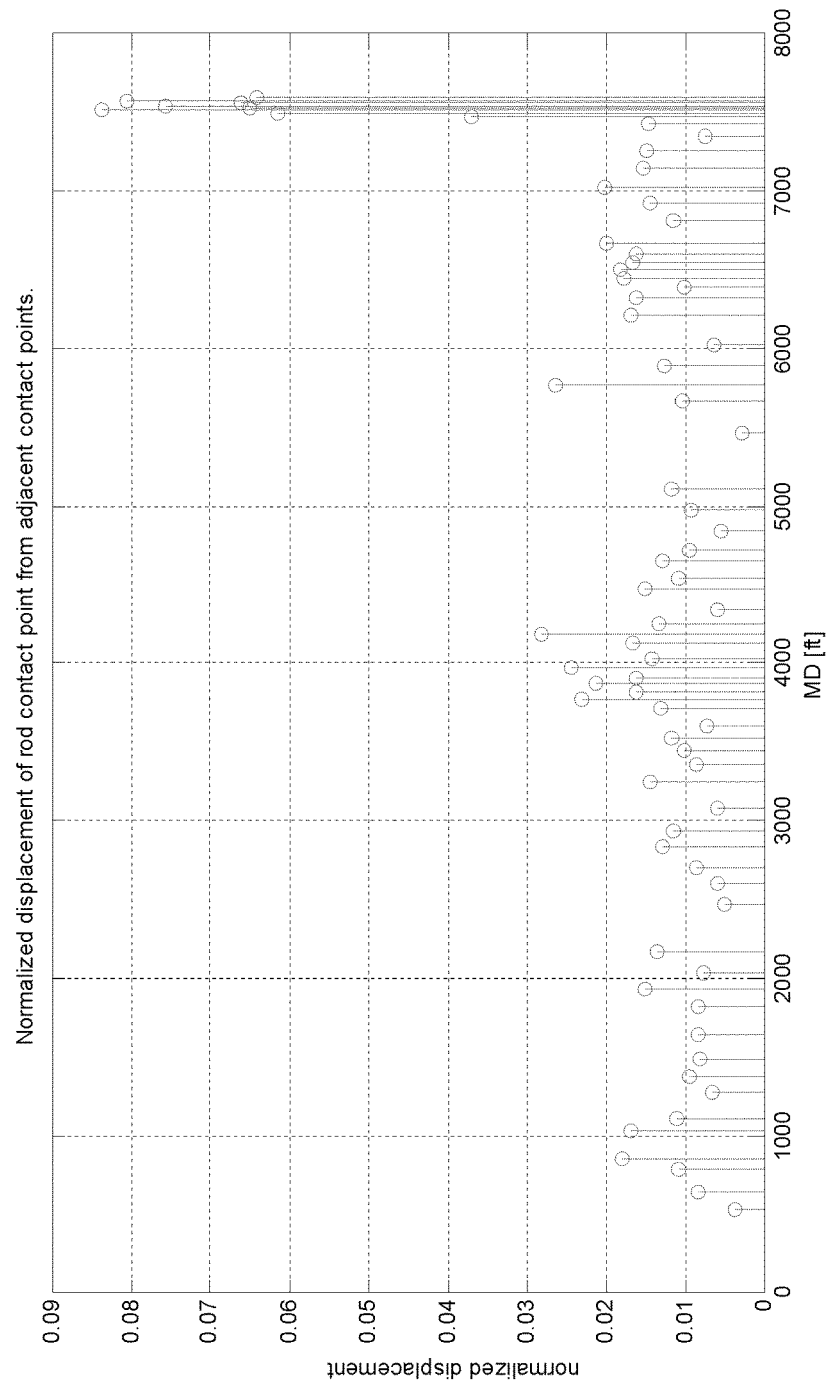
FIG. 5 is an example plot of the normalized displacement as a function of measured depth for an example rod in an example wellbore in accordance with certain embodiments described herein.

FIG. 5 is an example plot of the normalized displacement (dimensionless) as a function of measured depth for an example rod in an example wellbore in accordance with certain embodiments described herein. The normalized displacement is calculated as described above with regard to FIG. 4D. The plot of FIG. 5 shows about 70-80 contact points along the wellbore, and the normalized displacement at each contact point can be proportional to the amount of bending that the rod will undergo in a region near the contact point.

In certain embodiments, a threshold level of the normalized displacement can be predetermined (e.g., set by an operator while analyzing the data provided from the plurality of survey stations). Some or all of the normalized displacements can be compared to the threshold level, and contact points having normalized displacements that are greater than or equal to the threshold level can be considered to be potential locations along the wellpath for rod guides to be placed. Contact points having normalized displacements that are less than the threshold level can be considered to be locations along the wellpath that do not need rod guides.

Effective Inner Diameter Technique

Various methods for providing information regarding the tortuosity of the wellbore path can utilize example tortuosity parameters in accordance with certain embodiments described herein. For example, an example tortuosity parameter can be based on an effective inner diameter ($D_{eff}$) for the portion of the wellbore, with $D_{eff}$ defined as a maximum width of an outer periphery of a model device with a specified (e.g., predetermined) length that can be placed at, or passed through, the portion of the wellbore. For example, $D_{eff}$ for the portion of the wellbore can be defined as the maximum allowed outer diameter of a model straight tubular device with a specified (e.g., predetermined) length that can be placed at, or passed through, the portion of the wellbore. The model device can be a hypothetical device with one or more dimensions that are maximized within specified (e.g., predetermined) constraints to characterize the portion of the wellbore in which the model device is modeled to be placed at or passed through. The model device can be configured to approximate an actual device intended to be placed at, or passed through, the portion of the wellbore.

The wellbore has an actual inner diameter ($D_{actual}$) at each survey station along the wellbore, which can be approximately equal at each survey station or which can vary as a function of survey station. If the transverse displacements of the wellbore (e.g., displacements in a direction perpendicular to the along-hole direction of the wellbore between two or more survey stations) are equal to zero, then the $D_{eff}$ for the portion of the wellbore would be largely based on the $D_{actual}$. For example, the $D_{eff}$ between two survey stations of a portion of the wellbore with zero transverse displacements would be approximately equal to the minimum $D_{actual}$ between the two survey stations. However, a non-zero transverse displacement of the wellbore between two or more survey stations can reduce the area through which casings, equipment, etc. can be inserted, thereby making the $D_{eff}$ for the portion of the wellbore less than the minimum $D_{actual}$ of the portion of the wellbore.

In the example mentioned above, $D_{eff}$ for the portion of the wellbore can be defined as the maximum allowed outer diameter of a model straight tubular device with a specified (e.g., predetermined) length that can be placed at, or passed through, the portion of the wellbore. Thus, in this example, $D_{eff}$ would be dependent upon the length (L) of the model device to be placed at, or passed through, the portion of the wellbore. For example, if L increases, $D_{eff}$ either remains the same (e.g., if the addition to L does not include wellbore sections with additional restrictions), or $D_{eff}$ reduces (e.g., if the addition to L does include wellbore sections with additional restrictions). The general and expected trend is therefore that $D_{eff}$ decreases as L increases, and vice versa. For some simple model geometries, the relation between $D_{eff}$ and L can be derived, with the actual formula depending on the specified model geometry. For actual field data, the relation would be an unknown function.

In certain embodiments, the determination of $D_{eff}$ for a portion of the wellbore can be based on the maximum transverse displacement found over the relevant portion of the wellbore. For example, to determine the maximum transverse displacement, the transverse displacements of the individual survey stations along the relevant portion of the wellbore can be considered, and the largest of these transverse displacements can be defined to be the maximum transverse displacement. For another example, to determine the maximum transverse displacement, various combinations of the transverse displacements of any two or more survey stations can be considered. For example, the largest difference between the transverse displacements of any two survey stations along the portion of the wellbore can be defined to be the maximum transverse displacement. The maximum transverse displacement can be defined in other ways in accordance with certain embodiments described herein besides these examples.

In certain embodiments, whether the model device can be placed at, or passed through, the portion of the wellbore is determined based on the amount of transversal (e.g., bending) forces (F) that the model device would experience while the model device is within the portion of the wellbore, the amount of transversal (e.g., bending) moment (M) that the model device would experience while the model device is within the portion of the wellbore, or both. For example, $D_{eff}$ for the portion of the wellbore can be defined as the maximum outer diameter of the model device such that the model device would experience an amount of transversal (e.g., bending) forces that are less than or equal to a specified (e.g., predetermined) limit ($F_0$) which can be greater than or equal to zero (e.g., $F<=F_0$ with $F_0>=0$). For another example, $D_{eff}$ for the portion of the wellbore can be defined as the maximum outer diameter of the model device such that the model device would experience an amount of transversal (e.g., bending) moments that are less than or equal to a specified (e.g., predetermined) limit ($M_0$) which can be greater than or equal to zero (e.g., $M<=M_0$ with $M_0>=0$). The values of $F_0$ and $M_0$ can depend on various considerations, including but not limited to, the type of the device, manufacturer's specifications for the device, operational conditions for the device, previous experience with equipment similar to the device, and operator's requirements with regard to functionality and/or lifetime.

Conceptually, there are three general situations (e.g., types of positions) in which a device can be placed within a portion of the wellbore. In a first situation, the device is not subject to bending forces or moments due to the constrained dimensions of the portion of the wellbore. Such situations are the most desirable from an operational viewpoint in which to place the device, not only because the device retains its shape (e.g., straight) in such situations, but also because the device would be relatively stress-free and would not experience any operational degradation due to bending forces or moments.

In a second situation, the device is subject to non-zero bending forces or moments that are below the level of bending forces or moments that would create significant stresses within the device that would cause appreciable operational degradation of the device. In certain such situations, the device retains its shape (e.g., straight) despite experiencing non-zero bending forces or moments, and while the device does experience some amount of stress, little or no operational degradation results. In certain other such situations, for devices that have been designed to withstand a specified (e.g., predetermined) amount of shape alteration (e.g., bending), the shape of the device can be altered (e.g., bent) but the stresses remain sufficiently low that little or no operational degradation results. The levels of bending forces or moments that would create stresses that would cause operational degradation can be used to define the corresponding specified (e.g., predetermined) limits $F_0$ and $M_0$ described above.

In a third situation, the device is subject to bending forces or moments that are greater than or equal to the levels that would create stresses or would alter the shape of the device so as to cause at least some operational degradation. From an operational viewpoint, these situations are the least desirable, because the device would be experiencing operational degradation due to the significant bending forces or moments. However, while it can generally be desirable to avoid placing the device in such situations, complete avoidance may not always be practical in certain circumstances.

In certain embodiments, manufacturer's recommendations for the operation of the device can be used to determine where the device is to be placed (e.g., to place the device either in the first or second situations, but not in the third situation). For example, a manufacturer's recommendation that the device be placed in a portion of the wellbore that has less than two degrees of dogleg severity can be used to differentiate between portions of the wellbore at which the device would be in the undesirable third situation (e.g., where the dogleg severity is greater than or equal to two degrees) or in either of the desirable first or second situations (e.g., where the dogleg severity is less than two degrees).

In certain embodiments, $D_{\textit{eff}}$ is defined based on geometric considerations, including but not limited to: device length; device shape (e.g., variations of the cross-sectional dimensions along the device); and the maximum amount of bending allowed for the device. The maximum amount of bending allowed for the device can depend on the operational performance expected (e.g., desired) from the device, since higher amounts of bending can generally correspond to decreased operational performance. Examples of such operational performance factors include, but are not limited to: general aging and changes over time (e.g., caused by changing temperature, pressure, or production conditions), equipment wear, friction, power requirements, device installment procedures, operation, functionality, performance, or lifetime, or any combination of such factors. For example, if increased wear, increased power consumption, or reduced lifetime can be tolerated from the device, then a higher maximum amount of bending may be allowed for the device. In addition, these operational performance factors can be used in combination with the transversal forces (F) or transversal moments (M) experienced by the model device.

In certain embodiments, rather than being defined as the maximum allowed outer diameter of a model straight tubular device with a specified (e.g., predetermined) length, $D_{\textit{eff}}$ for the portion of the wellbore can be defined as the maximum allowed outer diameter of a model tubular device that can be placed at, or passed through, the portion of the wellbore with a specified (e.g., predetermined) length and configured to withstand a specified (e.g., predetermined) amount of bending (e.g., a degree of curvature). The bending of the model device can be selected to approximate the amount of bending that an actual device can be expected to withstand under normal operation and that is likely to not affect the life of the device.

Figure 6:
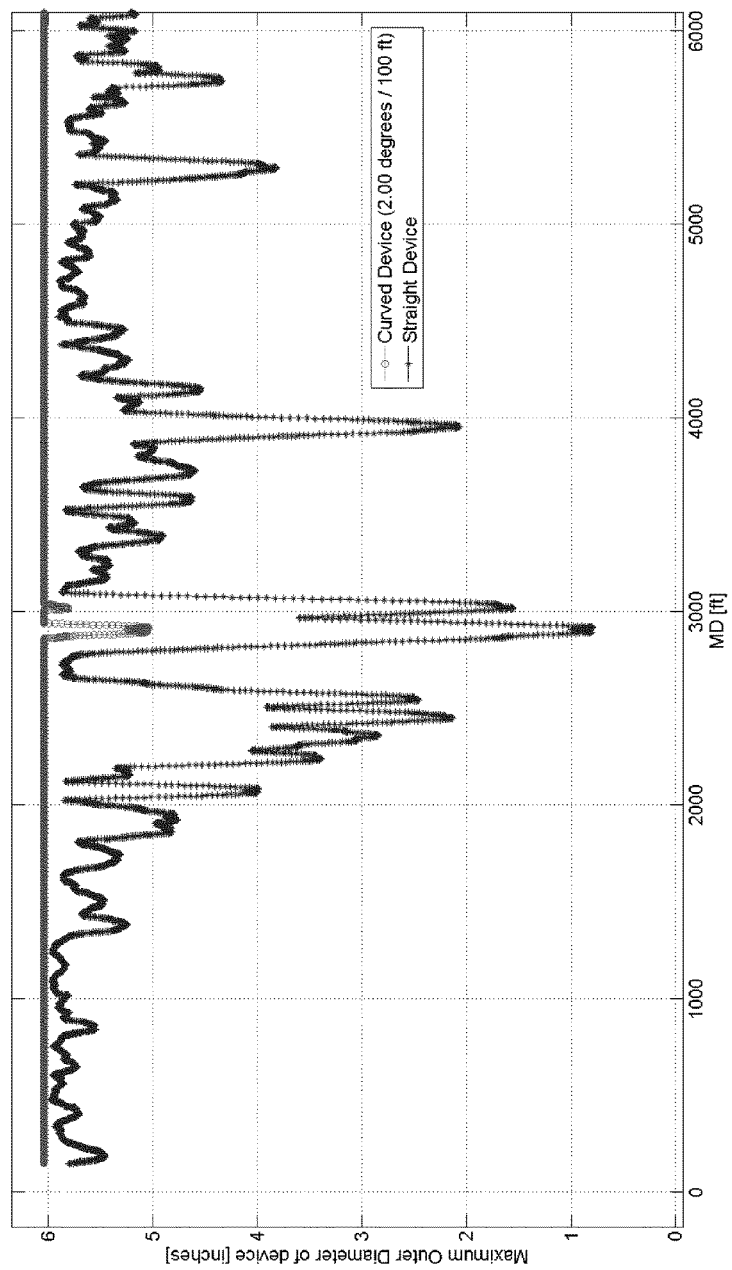
FIG. 6 shows two plots of the maximum outer diameter of a model device having a length of 100 feet as a function of the measured depth (MD) for a straight non-bendable model device and a straight bendable model device.

By allowing the model device to bend, $D_{\textit{eff}}$ for the portion of the wellbore would be calculated to be larger than it would if the model device were constrained to not bend. For example, the model device can be allowed to bend by an angle in the range of zero to five degrees per 100 feet of length. The amount of bend that is allowed can depend on various considerations, including but not limited to, the type of the device, manufacturer's specifications for the device, operational conditions for the device, previous experience with equipment similar to the device, and operator's requirements with regard to functionality and/or lifetime. FIG. 6 shows two plots of the maximum outer diameter of a model device having a length of 100 feet as a function of the measured depth (MD) of the model device within a wellbore. A first plot of FIG. 6 (labeled "Straight Device") corresponds to a model straight and non-bendable device and a second plot of FIG. 6 (labeled "Curved Device") corresponds to a model straight device that is configured to bend by at most two degrees across the 100-foot length of the model device. As seen in FIG. 6, the maximum outer diameter ($D_{\textit{eff}}$) determined using the bendable device is larger at all positions along the wellbore than that determined using the non-bendable device. Except for a region near a measured depth of 3000 feet, $D_{\textit{eff}}$ determined using the bendable device approximates the maximum inner diameter of 6 inches of the wellbore.

In certain embodiments, rather than using $D_{\textit{eff}}$ for the portion of the wellbore defined as the maximum allowed outer diameter of a model tubular device with a specified (e.g., predetermined) length, a maximum device length ($L_{max}$) can be defined as the maximum allowed length of a model tubular device that can be placed at, or passed through, the portion of the wellbore with a specified (e.g., predetermined) outer diameter of the device. For example, $L_{max}$ can be defined as the maximum length of the model device such that the model device experiences an amount of transversal (e.g., bending) forces F, moments M, or both that are less than or equal to corresponding specified (e.g., predetermined) limits ($F_0$, $M_0$). In certain embodiments, both $D_{\textit{eff}}$ for the portion of the wellbore and $L_{max}$ of the model device can be defined and used, such that the model device experiences an amount of transversal (e.g., bending) forces F, moments M, or both that are less than or equal to corresponding specified (e.g., predetermined) limits ($F_0$, $M_0$). For example, both $D_{\textit{eff}}$ for the portion of the wellbore and $L_{max}$ of the model device can be determined, either simultaneously or iteratively (e.g., first adjusting $D_{\textit{eff}}$, then adjusting $L_{max}$, then adjusting $D_{\textit{eff}}$, then adjusting $L_{max}$, etc.), such that the traversal (e.g., bending) forces F, moments M, or both are less than or equal to corresponding specified (e.g., predetermined) limits ($F_0$, $M_0$).

In certain embodiments, the model device can have a non-circular cross-section in a plane perpendicular to a direction along the length of the model device, it can have a varying outer diameter along the length of the model device, or both. In certain such embodiments, $D_{\textit{eff}}$ can be taken as a characteristic transverse dimension of the model device (e.g., the maximum transverse dimension of the model device).

In certain embodiments, the wellbore or casing can have a non-circular cross-section in a plane perpendicular to a direction along the length of the wellbore or casing, it can have a varying inner diameter along the length of the wellbore or casing, or both. In certain such embodiments, the actual inner diameter can be taken as a characteristic transverse dimension of the wellbore or casing (e.g., the minimum transverse dimension of the wellbore or casing).

Path Elongation Technique

Figure 7A:
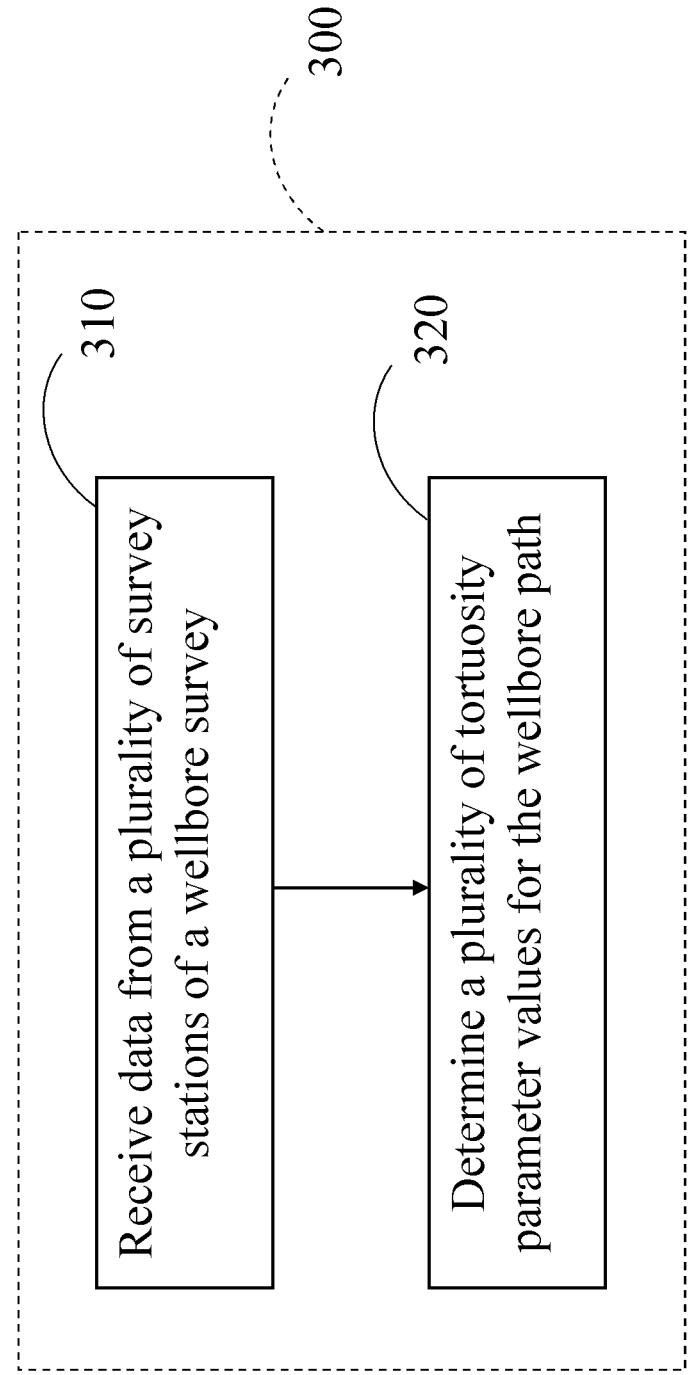
FIG. 7A is a flow diagram of an example method for providing information regarding the tortuosity of the wellbore path in accordance with certain embodiments described herein.
Figure 7B:
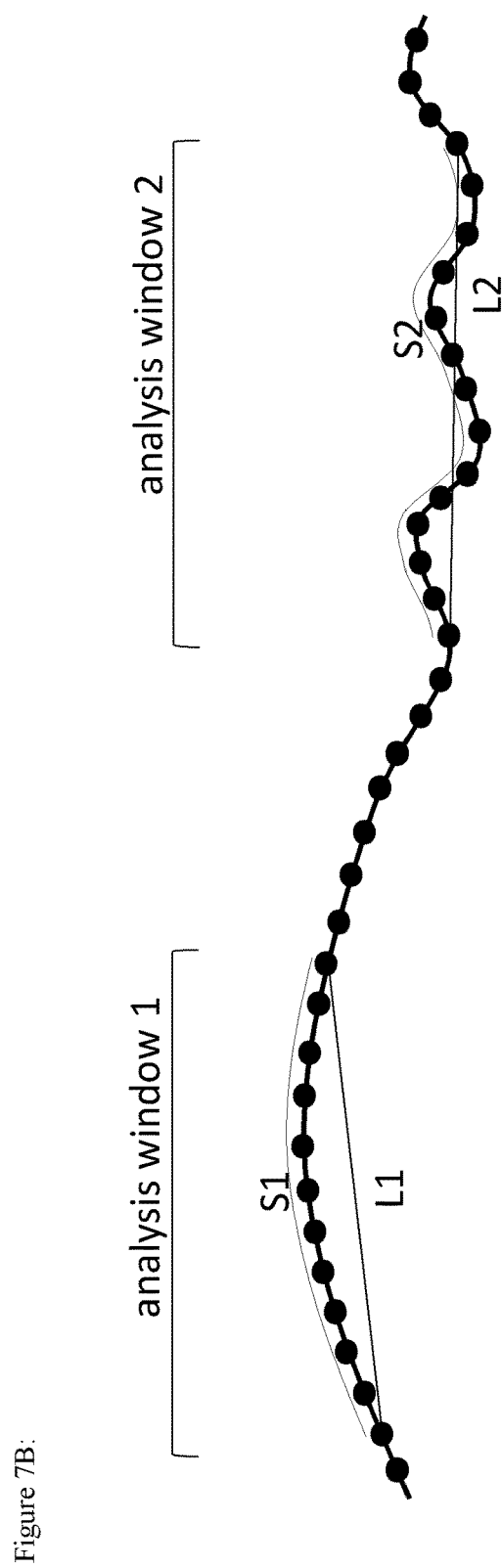
FIG. 7B schematically illustrates an example configuration compatible with the example method of FIG. 7A.

The preceding section discloses an example method for providing information regarding the tortuosity of the wellbore path. FIG. 7A is a flow diagram of an example method 300 for providing information regarding the tortuosity of the wellbore path in accordance with certain embodiments described herein, and FIG. 7B schematically illustrates an example configuration compatible with the example method 300 of FIG. 7A. The example method 300 utilizes an example tortuosity parameter (T) which is indicative of the tortuosity of a corresponding portion of the wellbore. For example, the tortuosity parameter T can depend on a ratio of a distance (S) along the wellbore path between two survey stations and a straight-line distance (L) between the two survey stations (e.g., T=S/L; T=S/L−1; other functions of S/L) in accordance with certain embodiments described herein. Either or both of the distances S and L can alternatively be measured along lines resulting from pre-processing (e.g., smoothing) of the wellbore path between two stations, such that S is measured along one pre-processed line, and L is measured along another pre-processed line, and the pre-processing is defined such that S>=L. For example, if S is the measured depth between two stations along the original wellbore path and L is a measured depth along a pre-processed or smoothed path, which can be a straight line or a curved line, the resulting ratio S/L will provide a measure of short-scale tortuosity along the wellbore path.

Another example tortuosity parameter (T) can be calculated by summing the magnitudes of displacements (e.g., in a direction generally perpendicular to the wellbore path) of a reference line defined by two survey stations bounding a section of the wellbore (see, e.g., FIG. 3B) and dividing the sum by the straight-line distance (L) between the two survey stations (e.g., the length of the reference line). Other tortuosity parameters are also compatible with the various embodiments described herein to quantify the tortuosity of portions of the wellbore.

The tortuosity parameter will equal a certain value for a perfectly straight wellbore portion, and will differ from that value for a bending wellbore portion, by an amount that increases as perturbations of the wellbore path increase. In certain embodiments, the tortuosity of the wellbore path is determined by examining an analysis window (e.g., having a fixed length) as the analysis window is moved (e.g., slid) along the portion of the wellbore path. The length of the analysis window can be varied to determine the tortuosity over different lengths of the wellbore path. For example, the length of the analysis window can be selected to be equal to the length of a physical device to be inserted into the wellbore, or the length of the analysis window can be selected based on the spatial frequency estimates (e.g., equal to a threshold line value between high frequency and low frequency values from the spatial frequency plot of the spectral analysis technique described herein). The method 300 and the method 200 can be considered to be complimentary to one another.

The example method 300 comprises receiving data from a plurality of survey stations of a wellbore survey in an operational block 310. The data includes information regarding a position of the wellbore path at each survey station of the plurality of survey stations. For example, the data can include information regarding the inclination (Inc), the azimuth (Az), and the measured depth (MD) of the wellbore path at each survey station of the plurality of survey stations (e.g., the plurality of survey stations that are to be analyzed). For another example, the data can include information regarding the north (N), the east (E), and the vertical (V) coordinates of the wellbore path at each survey station of the plurality of survey stations (e.g., the plurality of survey stations that are to be analyzed). The data can be generated during a wellbore survey with high spatial resolution (e.g., a survey with a short spacing between sequential survey stations, for example, less than 30 meters, less than 10 meters, less than 1 meter, less than 0.5 meter, less than 0.3 meter, less than 0.1 meter). Such high spatial resolution data can be used to analyze small-scale wellbore curvature (e.g., having a measured depth in a range between 1 meter to 100 meters). In certain embodiments, receiving the data comprises generating the data by running a wellbore survey tool within the wellbore.

The example method 300 further comprises determining a plurality of tortuosity parameter values for the wellbore path within a corresponding plurality of analysis windows in an operational block 320. For example, as schematically illustrated in FIG. 7B, an analysis window can be defined to denote a portion of the data and the analysis window can be moved (e.g., slid) to denote different portions of the data. The portions of the data can be sequential to one another, and two or more neighboring portions can overlap one another. For example, the analysis window can be moved between successive positions by a predetermined amount (e.g., one survey station) that is smaller than a width of the analysis window (e.g., 10 survey stations).

For each portion of the data (e.g., for each position of the analysis window), a tortuosity parameter value can be calculated for the analysis window based on two or more survey stations within the analysis window. FIG. 7B schematically illustrates a distance (S1) along the wellbore path between the two survey stations for "analysis window 1" and a distance (L1) in a straight line between the two survey stations for "analysis window 1." FIG. 7B also schematically illustrates a distance (S2) along the wellbore path between the two survey stations for "analysis window 2" and a distance (L2) in a straight line between the two survey station for "analysis window 2." In certain embodiments, the two survey stations can be at respective ends of the analysis window. In certain embodiments, if the survey station positions are calculated from the original survey data (e.g., not from smoothed data), the distance S can be defined as the sum of the measured depths (MD) between sequential survey stations from a first (e.g., start) survey station to a second (e.g., end) survey station of the analysis window: $S=\Sigma_j dMD_j$, where $dMD_j$ is the measured depth (along the wellbore) increment between two neighboring survey stations, with the summation taken over all the increments within the analysis window.

The value of the tortuosity parameter (e.g., T=S/L−1) can be calculated for each analysis window, and in certain embodiments, the values of the tortuosity parameter T can be plotted as a function of the measured depth (MD) to provide a graph of the tortuosity as a function of MD. For example, for "analysis window 1," the tortuosity parameter T will have a low to moderate value since this portion of the wellbore path is relatively smooth. For "analysis window 2," the tortuosity parameter T will have a high value since this portion of the wellbore path has significant perturbations relative to the straight line of "analysis window 2."

In certain embodiments, the tortuosity parameter can be decomposed into various components. For example, if the distance S is expressed as $S=L+dS_{lse}+dS_{sse}$, where $dS_{lse}$ is the long-scale elongations (e.g., contribution to elongation compared to L from long-scale variations) of the wellbore path and $dS_{sse}$ is the short-scale elongations (e.g., contribution to elongation compared to L from short-scale variations)

of the wellbore path, then the tortuosity parameter $T=(S/L)-1$ can be expressed as $T=dT_{lse}+dT_{sse}$, where $dT_{lse}=dS_{lse}/L$ is the long-scale tortuosity of the wellbore path and $dT_{sse}=dS_{sse}/L$ is the short-scale tortuosity of the wellbore path. The short-scale tortuosity $dT_{sse}$ can be expected to have the greatest influence on where equipment may be positioned along the wellbore path. In certain embodiments, the tortuosities on various length scales can be identified and separated from each other. For example, the long-scale tortuosity $dT_{lse}$ can be identified using at least one of the spectral analysis technique and the displacement technique described above.

the short-scale tortuosity $dT_{sse}$ can be derived by subtracting the long-scale tortuosity $dT_{lse}$ from the total tortuosity T derived using the path elongation technique.

The short-scale elongation $dS_{sse}$ can also be derived directly by high-pass spatial filtering of one or more of the parameters (Inc, Az, N, E, V) as a function of MD and the short-scale tortuosity $dT_{sse}$ can be derived from short-scale elongation $dS_{sse}$ using the relation $dT_{sse}=dS_{sse}/L$.

Display of Tortuosity

Various techniques may be used to display the tortuosity determined by one or more of the above-described techniques in accordance with certain embodiments described herein. For example, a tabular listing of numeric values can be displayed. For another example, graphical images or structures can be used to display the tortuosity. Such graphical images or structures can include, but are not limited to, graphs of the tortuosity parameter (e.g., $T=S/L-1$; $D_{eff}$) versus another parameter of the wellbore (e.g., measured depth); color-coded plots; two-dimensional plots or three-dimensional plots showing how the transverse displacements restrict the physical space available to a device within the wellbore (e.g., shown directly as renderings of physical objects; shown by color coding); three-dimensional physical model (e.g., manufactured by 3D printing) of the portion of the wellbore or casing section of interest (e.g., a reduced scale model, which can be compact or hollow) along with a physical model (e.g., manufactured by 3D printing) of the device to be inserted within the wellbore (e.g., a reduced scale model of the device with the same scale as the reduced scale model of the portion of the wellbore). In certain embodiments, the graphical images or structures can also include other wellbore data (e.g., drilling procedure data, data from logs or logging-while-drilling surveys). For example, the graphical images or structures can include data regarding the tortuosity (e.g., path elongation) parameter or the varying (e.g., reduced) diameter of the wellbore (e.g., shown as a graph or using color coding) with traditional log displays.

In certain embodiments, a threshold value of tortuosity can be predetermined and in a display showing the wellbore path, the portions of the wellbore path having a tortuosity less than the threshold value can be shown in a different manner than are the portions of the wellbore path having a tortuosity greater than the threshold value. For example, the portions of the wellbore path having a tortuosity less than the threshold value can be labeled as "low" and the portions of the wellbore path having a tortuosity greater than the threshold value can be labeled as "high." For another example, the portions of the wellbore path having a tortuosity less than the threshold value can be shown using a first color and the portions of the wellbore path having a tortuosity greater than the threshold value can be shown using a second color different from the first color. In certain embodiments, the portions of the wellbore path are shown with a color coding that corresponds to the amount of tortuosity or the amount of diameter reduction of the portion of the wellbore path. In certain embodiments, an appropriate label can be generated (e.g., automatically) and displayed with the wellbore path data to denote portions of the wellbore path having features or attributes of interest.

Figure 8A:
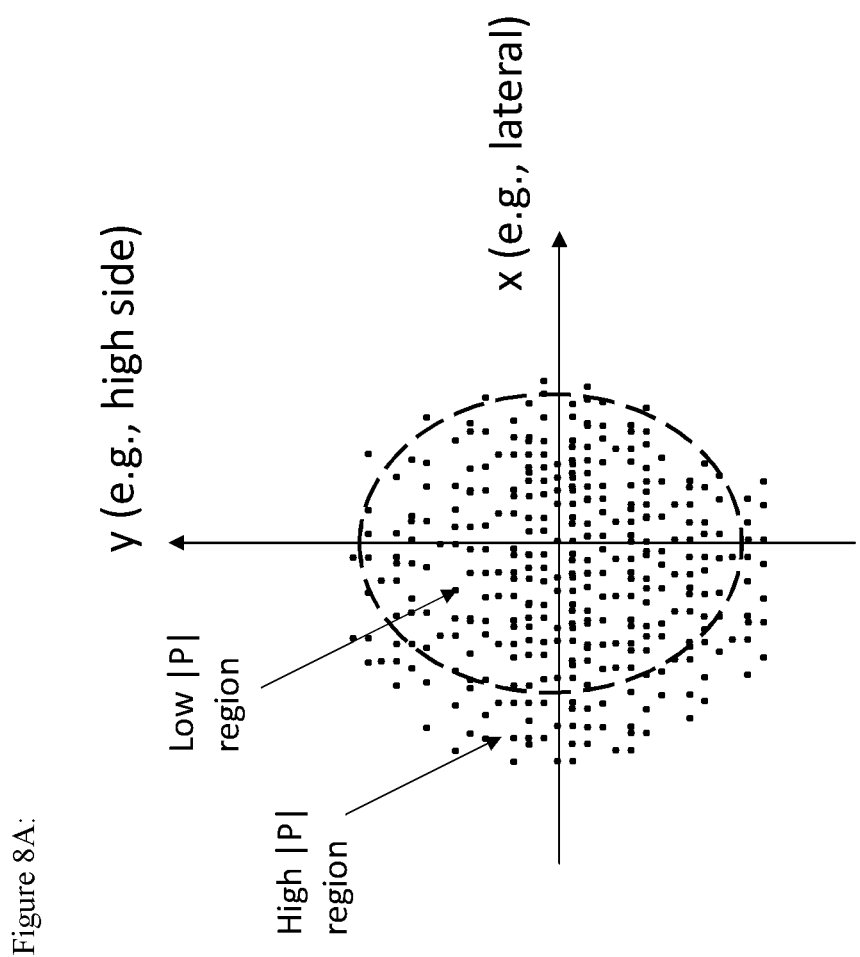
FIGS. 8A-8C schematically illustrate example displays in accordance with certain embodiments described herein.
Figure 8B:
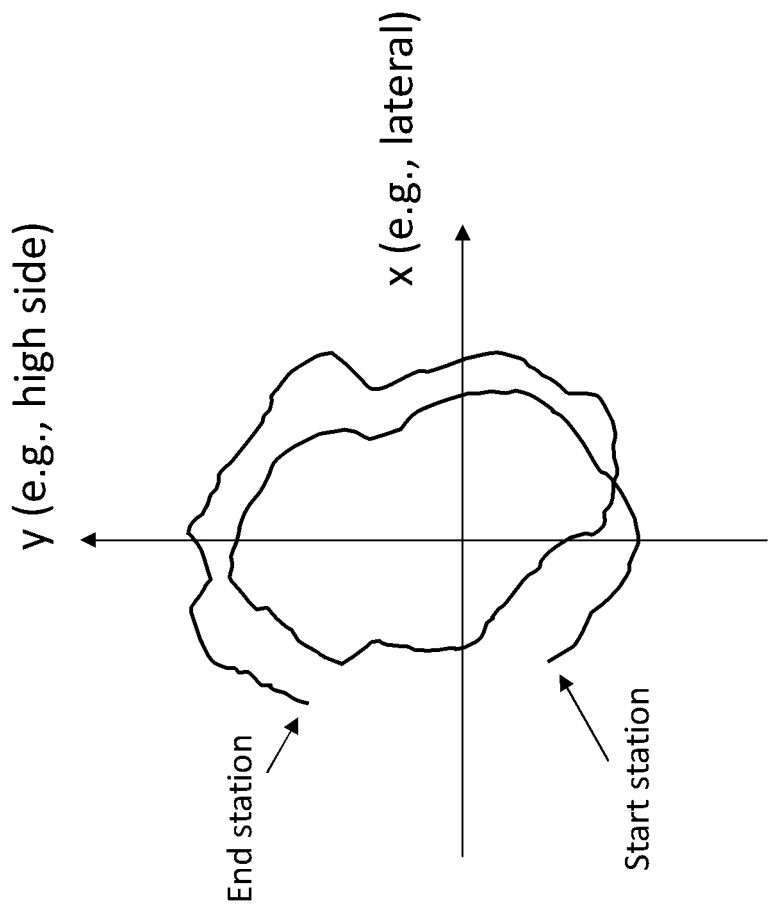
Figure 8C:
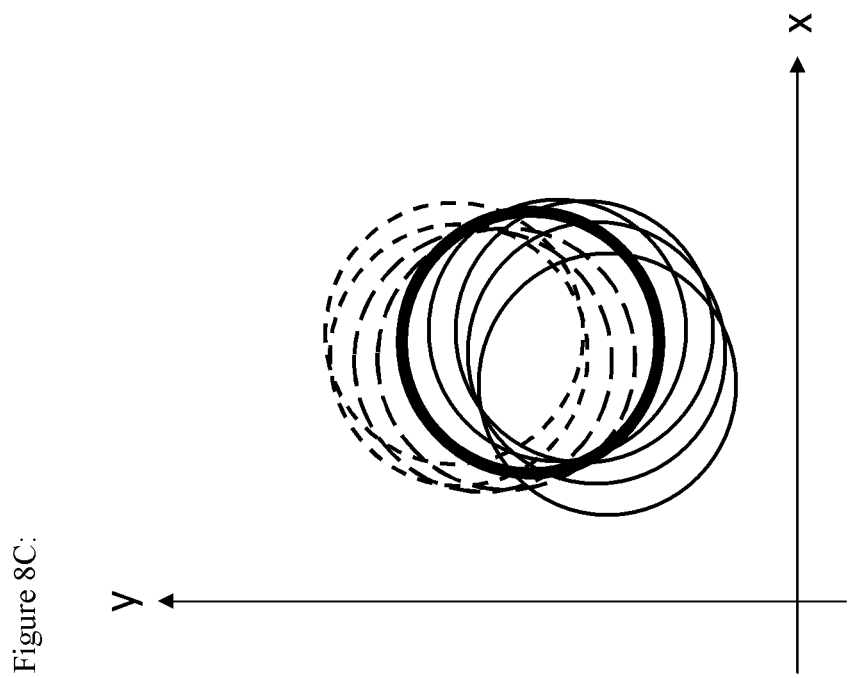
Figure 9:
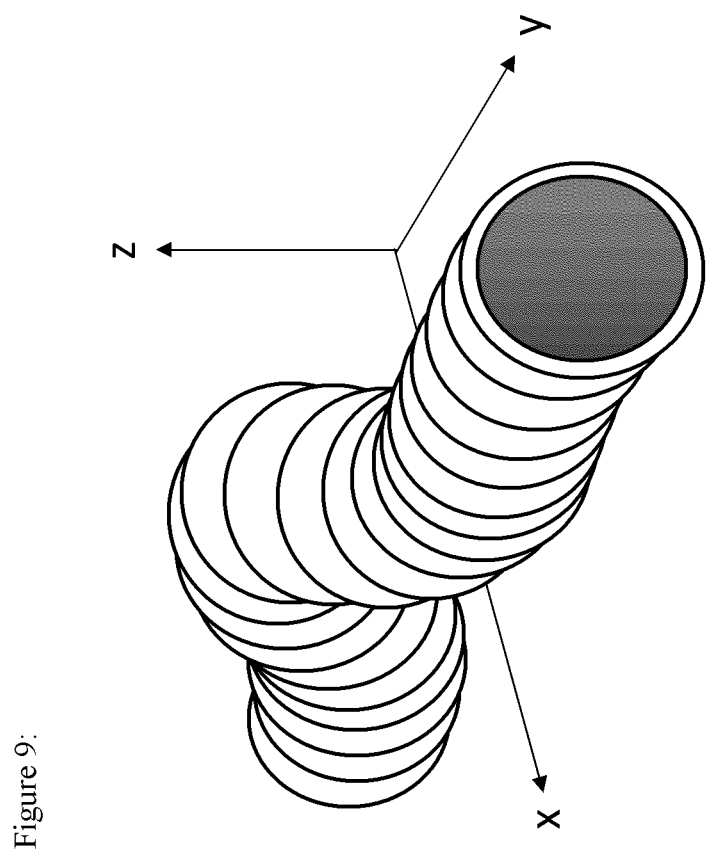
FIG. 9 schematically illustrates an example display in accordance with certain embodiments described herein.

FIGS. 8A-8C, 9, and 10 schematically illustrate example displays of the tortuosity determined by one or more of the above-described techniques in accordance with certain embodiments described herein. Other display formats may be used to facilitate communicating the tortuosity of the wellbore. In FIG. 8A, the various displacements resulting from the method 200 are plotted as points in the x-y plane (e.g., with the x-axis corresponding to a lateral direction and the y-axis corresponding to a high side direction). Displacements having magnitudes within a predetermined area (e.g., within the area bounded by the dashed line in FIG. 8A) can be considered to be in a low displacement region of the display (e.g., denoting portions of the wellbore path having low tortuosity) and displacements having magnitudes outside the predetermined area can be considered to be in a high displacement region of the display (e.g., denoting portions of the wellbore path having high tortuosity). Such displays can be advantageously used to reveal large displacement magnitudes or trends in the offset direction of the displacements. In FIG. 8B, the various displacements are plotted sequentially (e.g., from a start station sequentially to an end station) in the x-y plane (e.g., with the x-axis corresponding to a lateral direction and the y-axis corresponding to a high side direction). Such displays can be advantageously used to reveal wellbore spiraling or other conditions in which the displacements exhibit a certain trend or vary systematically in direction along the wellbore. In FIG. 8C, the various displacements are used to overlay circles representing the casing or wellbore wall cross-sections in the x-y plane, showing how the displacement varies with measured depth (MD). In FIG. 9, the casing or wellbore wall cross-sections are shown in a three-dimensional rendering. In displays such as those of FIGS. 8C and 9, the displacements may be scaled up with respect to the casing or wellbore cross-section dimensions, in order to show the tortuosity more clearly. In certain embodiments, displays similar to those of FIGS. 8A-8C and 9 may be used to show the magnitude of the tortuosity parameter.

Figure 10:
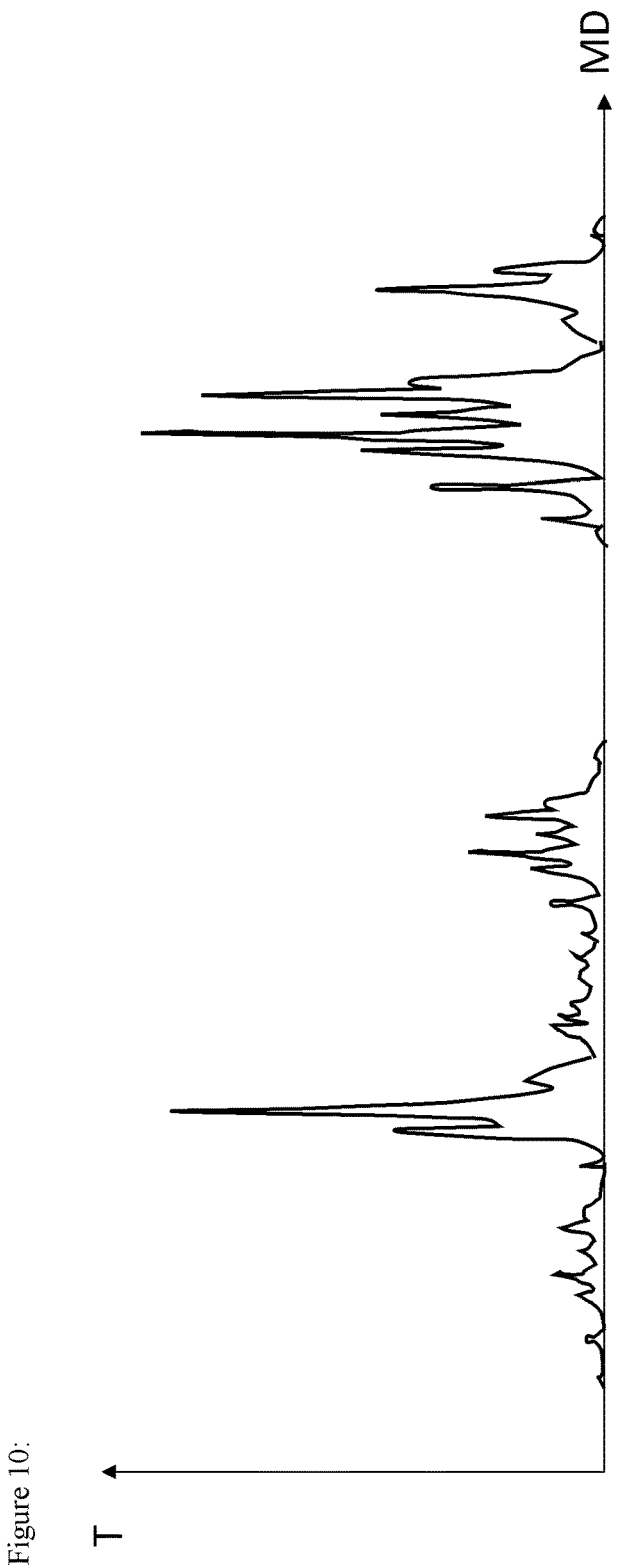
FIG. 10 schematically illustrates another example display in accordance with certain embodiments described herein.

In FIG. 10, the tortuosity (e.g., path elongation) parameter T is plotted as a function of the measured depth (MD). Similar graphs may be displayed to show the tortuosity based on Inc data alone, on Az data alone, on any combination of Inc, Az, N, E, or V data, or data separated into large-scale and small-scale variations.

Figure 11A:
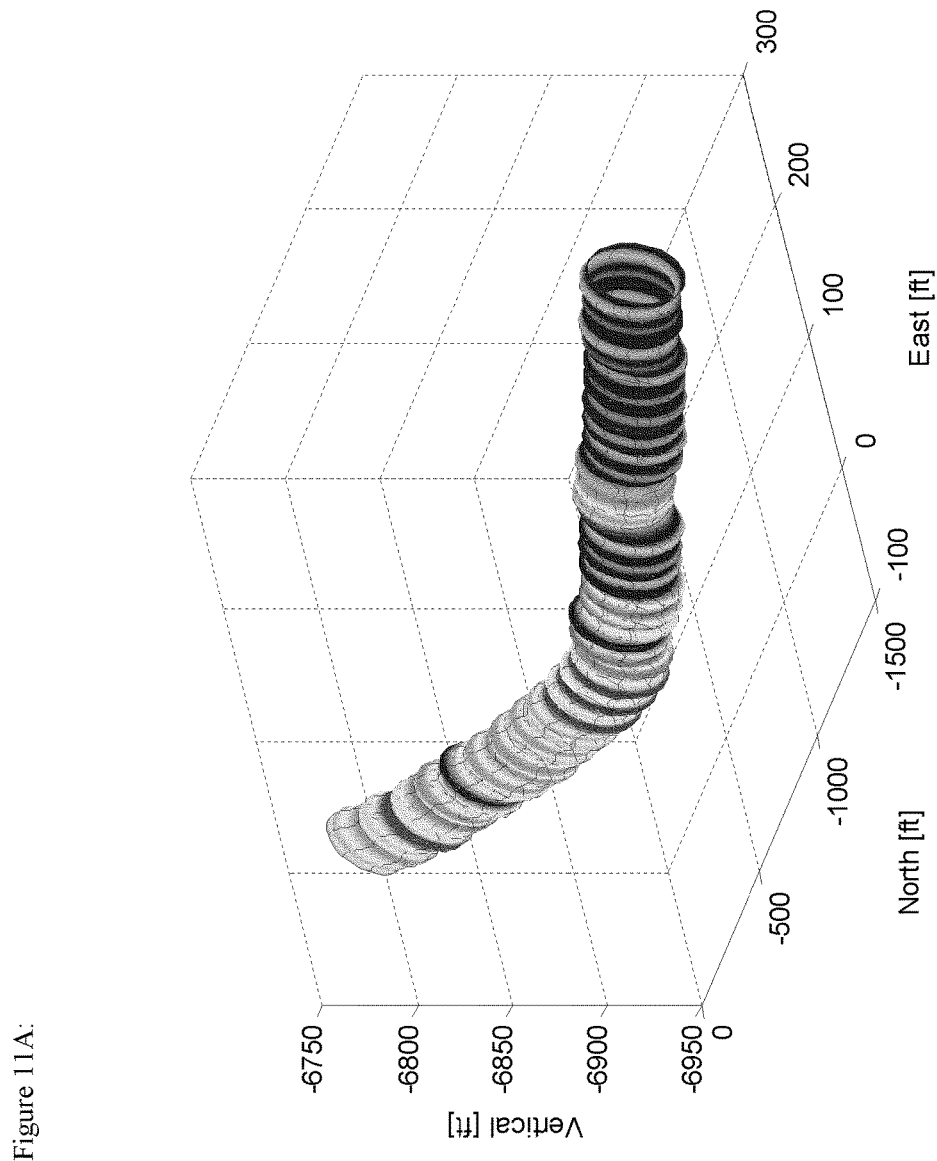
FIGS. 11A and 11B show example three-dimensional renderings of the transverse displacement measured along a portion of a wellbore in accordance with certain embodiments described herein.
Figure 11B:
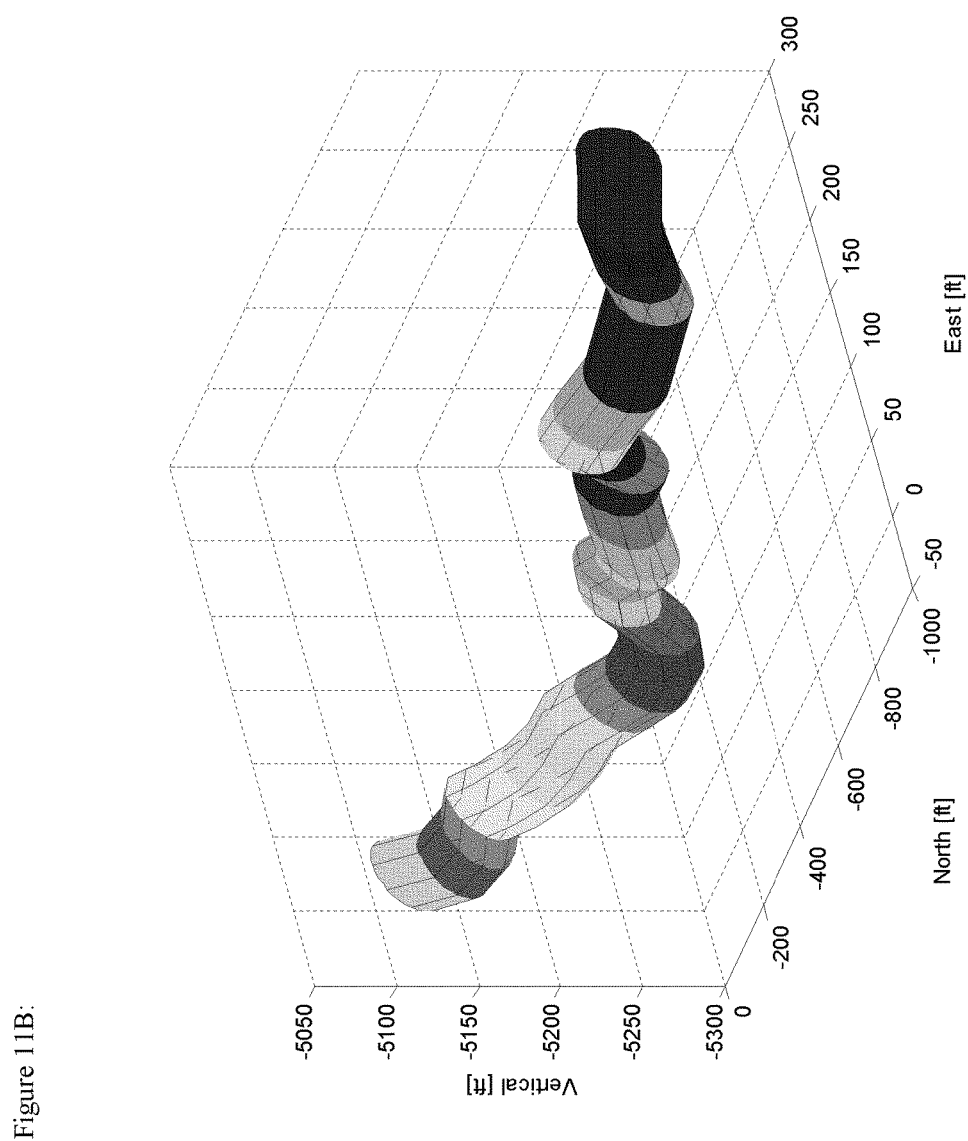

FIGS. 11A and 11B show example three-dimensional renderings of the transverse displacement measured along a portion of a wellbore in accordance with certain embodiments described herein. FIG. 11A corresponds to a gyroscopic survey taken with survey stations at one-foot intervals, while FIG. 11B corresponds to a measurement-while-drilling (MWD) survey taken with survey stations at approximately 30-100 feet intervals. The portion of the wellbore in FIGS. 11A and 11B has a measured depth between 7000 feet and 8000 feet. The casing diameters and transverse displacements are scaled up in FIGS. 11A and 11B for illustration purposes. The transverse displacement at a survey station in the wellbore is the deviation of the survey station from the best straight line fit around the vicinity of the survey station. A small deviation indicates a smooth well path at the survey station, while a large deviation indicates a high well path variation. As shown in FIGS. 11A and 11B, the color or shading of a specific portion of the wellbore can be indicative of the magnitude of the transverse displacement at the specific portion of the wellbore.

Figure 12A:
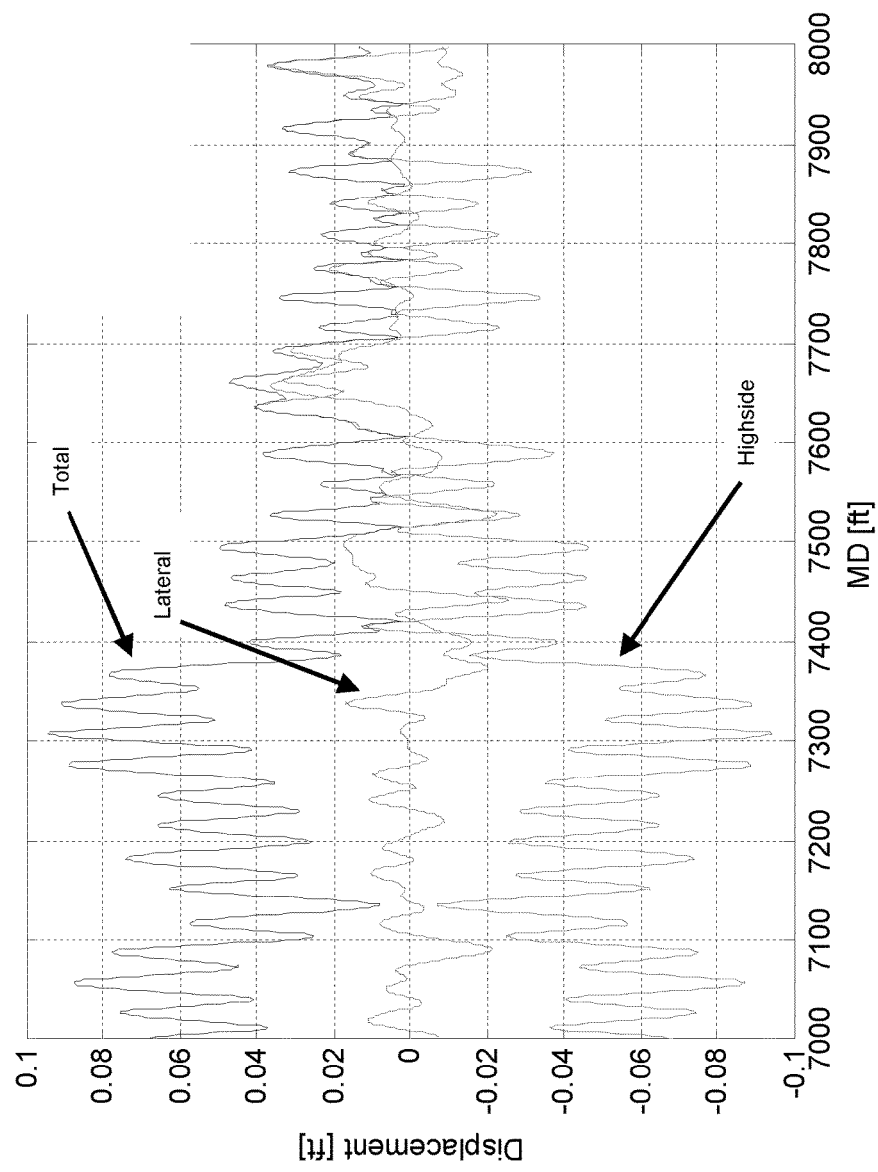
FIGS. 12A and 12B show example highside, lateral, and total transverse displacements as a function of measured depth of a portion of a wellbore in accordance with certain embodiments described herein.
Figure 12B:
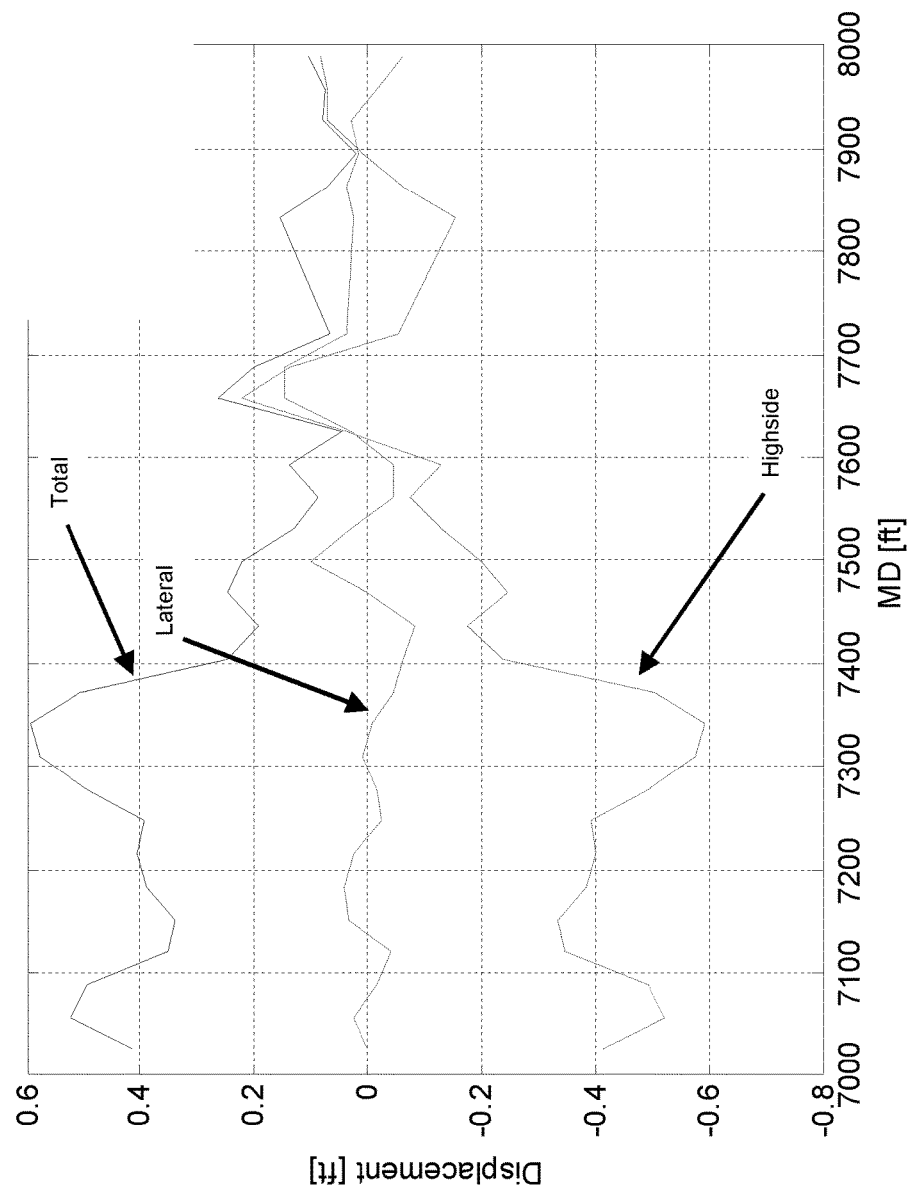

FIGS. 12A and 12B show example highside, lateral, and total transverse displacements as a function of measured depth of a portion of a wellbore in accordance with certain embodiments described herein. FIG. 12A corresponds to a gyroscopic survey taken with survey stations at one-foot intervals, while FIG. 12B corresponds to a measurement-while-drilling (MWD) survey taken with survey stations at approximately 30-100 feet intervals. The transverse displacement is defined as described above with regard to FIGS. 11A and 11B. The total transverse displacement comprises a highside component and a lateral component. The polarities of these components denote their direction.

Figure 13A:
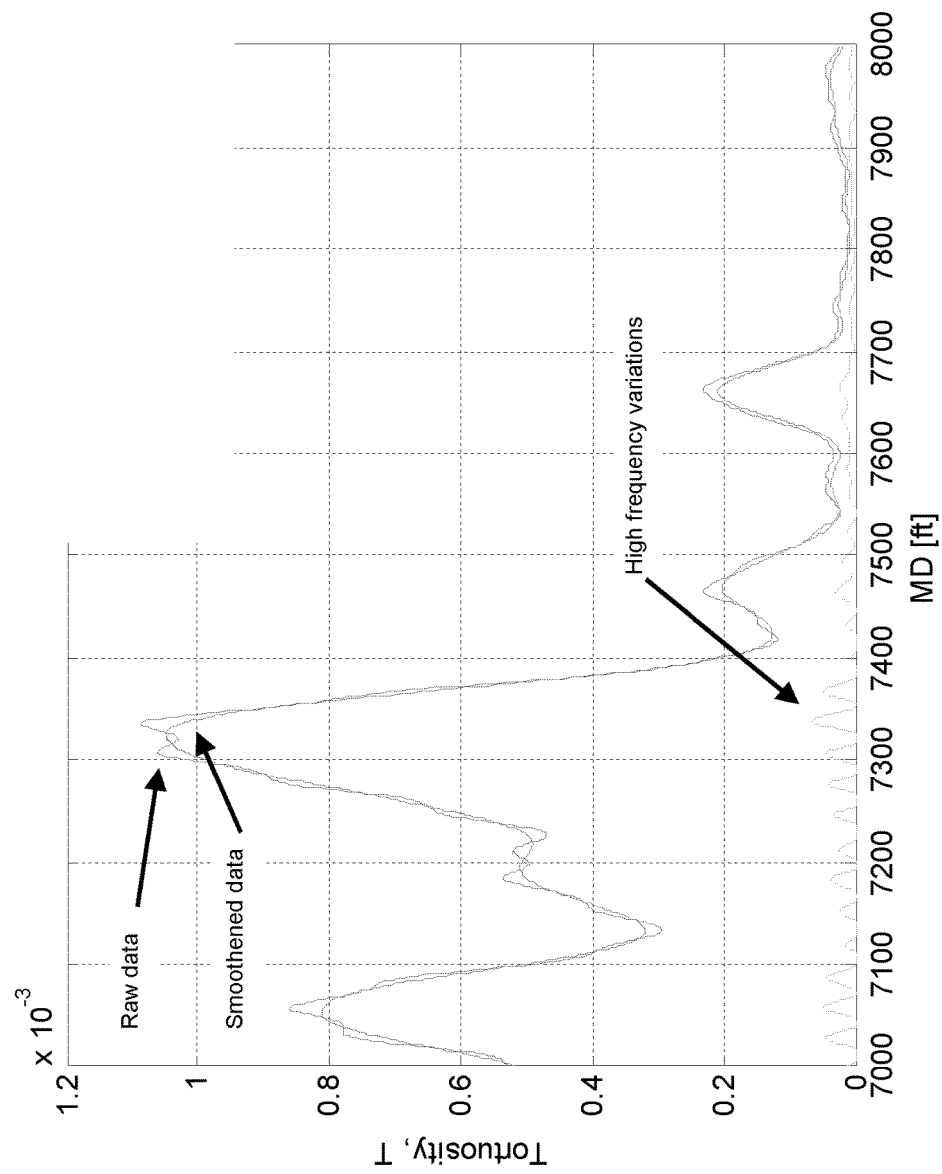
FIGS. 13A and 13B show an example tortuosity of the wellbore as a function of measured depth in accordance with certain embodiments described herein.
Figure 13B:
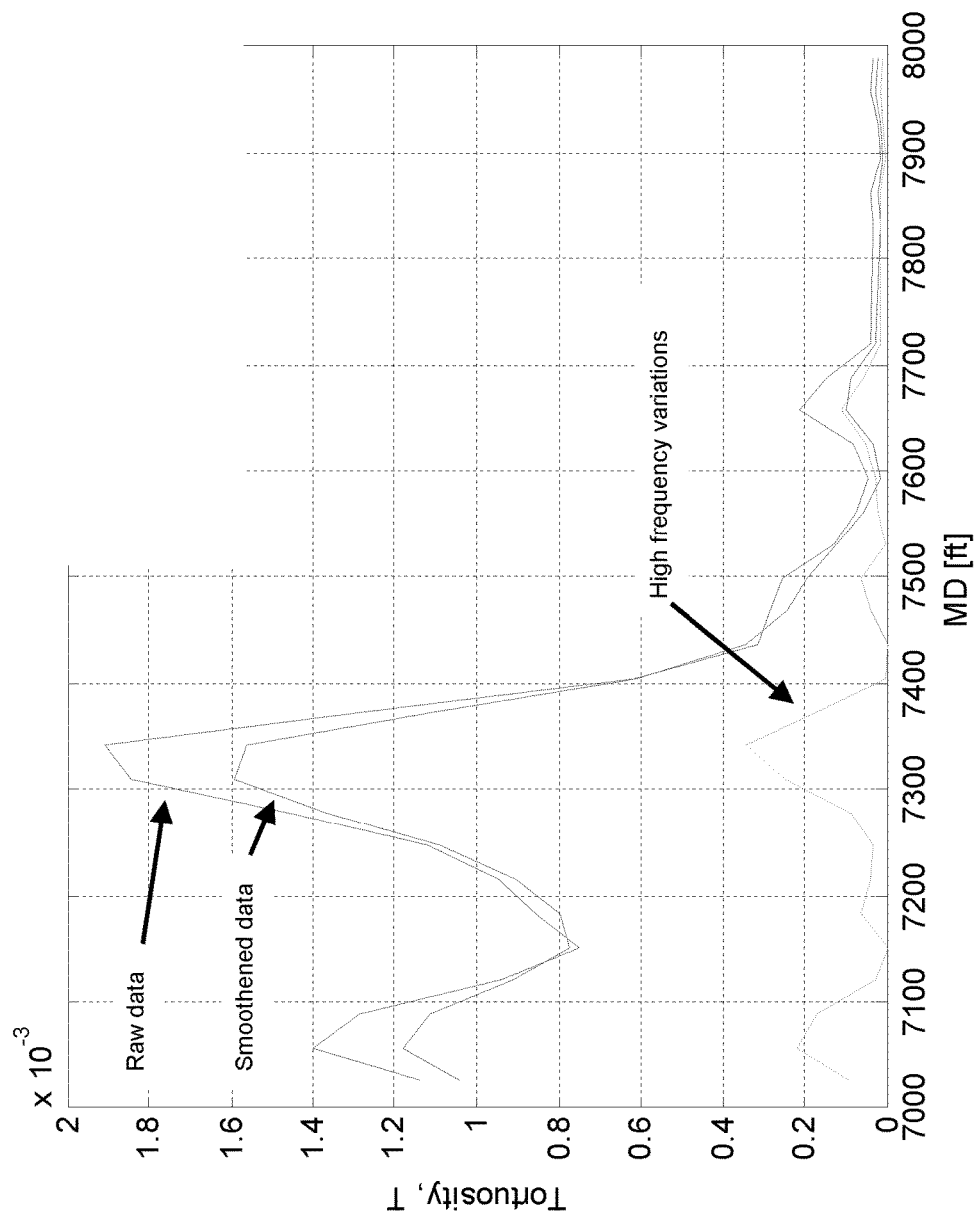

FIGS. 13A and 13B show an example tortuosity of the wellbore as a function of measured depth in accordance with certain embodiments described herein. FIG. 13A corresponds to a gyroscopic survey taken with survey stations at one-foot intervals, while FIG. 13B corresponds to a measurement-while-drilling (MWD) survey taken with survey stations at approximately 30-100 feet intervals. The tortuosity at a point in the wellbore in FIGS. 13A and 13B is defined as the ratio of the length along a section of the wellbore around the vicinity of the point to the length of a straight line joining the ends of the section, reduced by one (e.g., T=S/L−1). The length of the section is selected to be approximately equal to the length of the device to be placed in the wellbore. A high tortuosity signifies a large well path variation, and a tortuosity of zero means that the well path around the point fits a straight line. The tortuosity can be separated into small-scale and large-scale variations. In FIGS. 13A and 13B, the tortuosity computed from the raw data is the total tortuosity. The tortuosity derived from the smoothened data is a function of the large-scale variation. The difference between the total and the large-scale tortuosity is a measure of the small-scale (e.g., high spatial frequency) well path variation.

Figure 14A:
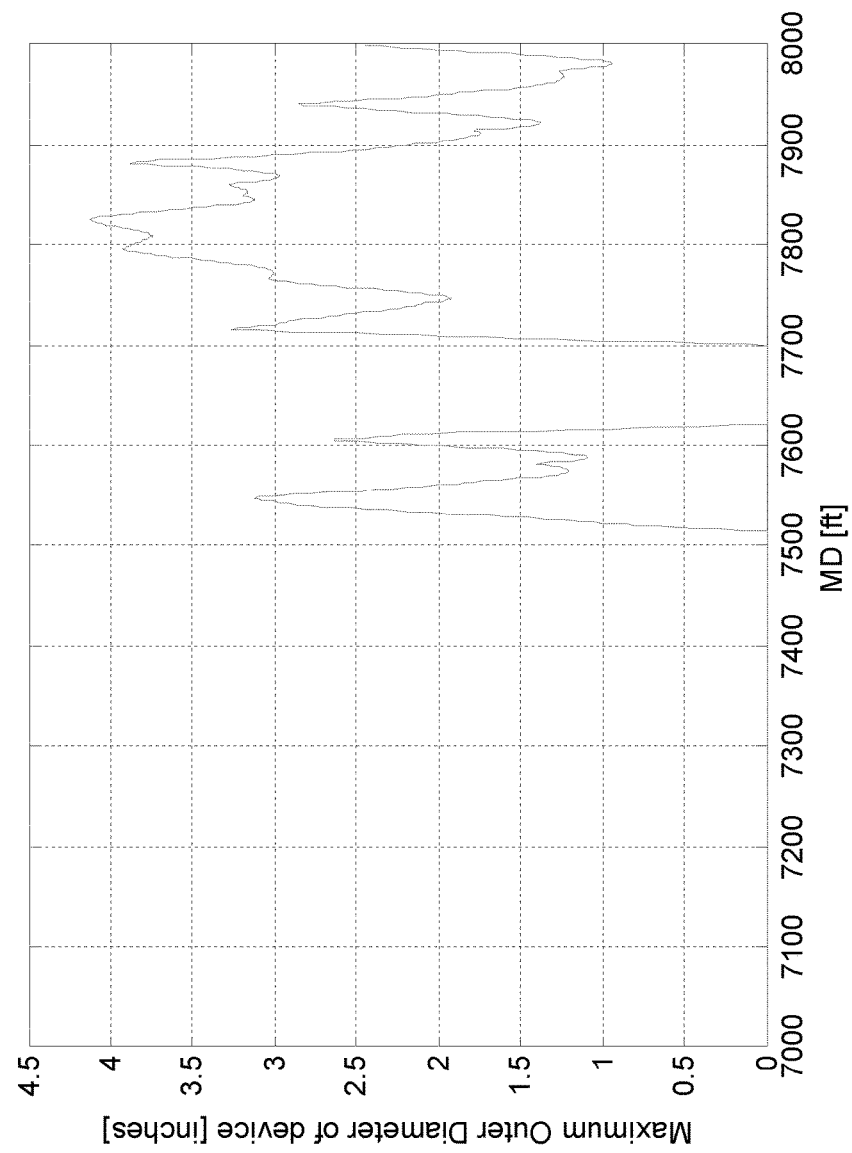
FIGS. 14A and 14B show example plots of the maximum outer diameter of a model device 90 feet long that can be placed at a specific measured depth along the wellbore in accordance with certain embodiments described herein.
Figure 14B:
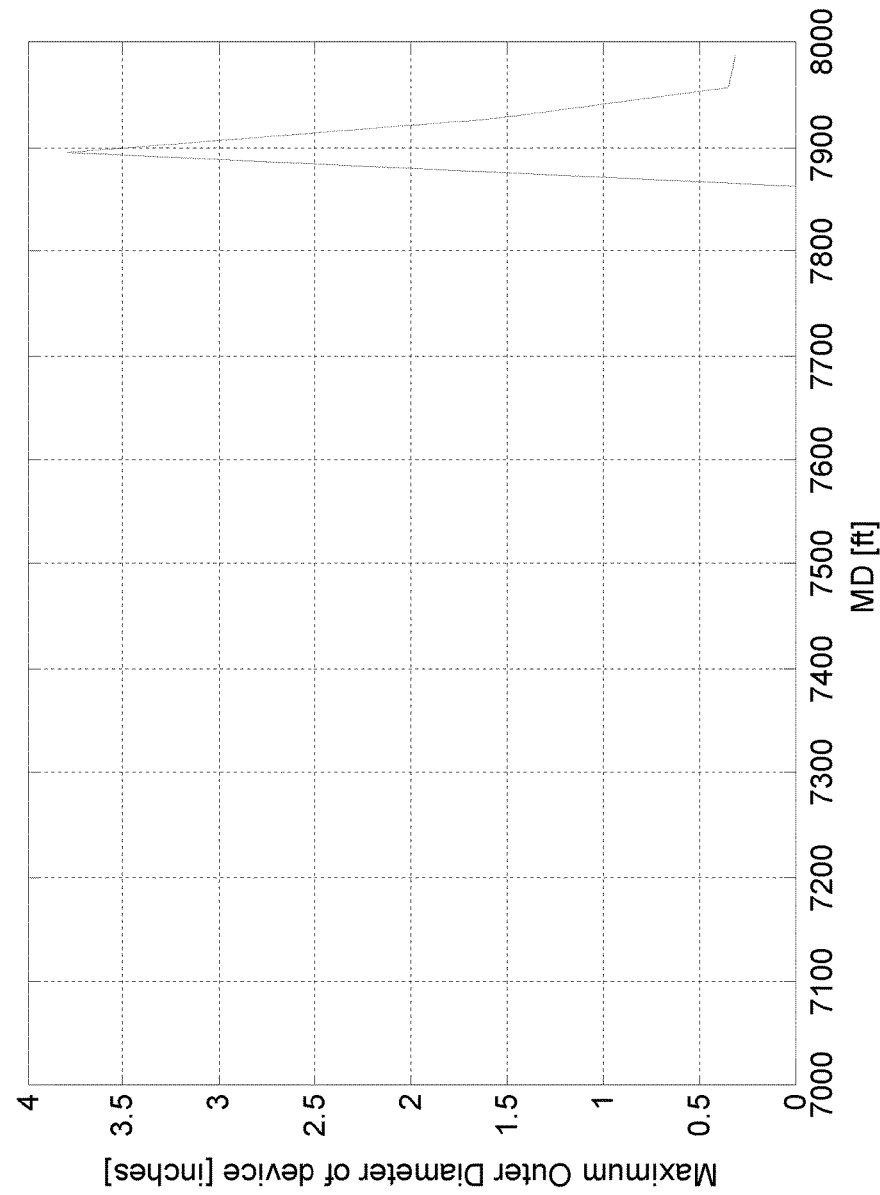

FIGS. 14A and 14B show example plots of the maximum outer diameter of a model device 90 feet long that can be placed at a specific measured depth along the wellbore in accordance with certain embodiments described herein. FIG. 14A corresponds to a gyroscopic survey taken with survey stations at one-foot intervals, while FIG. 14B corresponds to a measurement-while-drilling (MWD) survey taken with survey stations at approximately 30-100 feet intervals. The maximum outer diameter will be low at depths where the well path variation is high, and can be no higher than the casing inner diameter of the wellbore (e.g., 6.04 inches).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Although described above in connection with particular embodiments, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. A method, comprising:
    receiving survey data corresponding to a plurality of survey stations of a wellbore survey of a wellbore path, wherein the received survey data comprises gyroscopic data, data from magnetic instruments, or combinations thereof;
    defining a plurality of reference lines for the wellbore path based on the received survey data; and determining a plurality of displacements of the wellbore path from the plurality of reference lines.

2. The method of claim 1, further comprising:
determining positional data for the plurality of survey stations based on the received survey data, wherein the positional data comprises:
data regarding a position of the wellbore path at each survey station of the plurality of survey stations;
data regarding the north, east, and vertical coordinates of the wellbore path at each survey station of the plurality of survey stations; or
combinations thereof; and
defining the plurality of reference lines for the wellbore path based on the positional data.

3. The method of claim 1, wherein receiving the survey data comprises generating the survey data by running a wellbore survey tool within a wellbore.

4. The method of claim 1, wherein the plurality of reference lines are within a corresponding plurality of analysis windows and each analysis window denotes a corresponding portion of the survey data.

5. The method of claim 4, wherein each reference line is defined within the corresponding analysis window based on two or more survey stations within the corresponding analysis window.

6. The method of claim 4, wherein determining the plurality of displacements comprises, for each analysis window, determining a displacement of the wellbore path at one or more predetermined positions within the analysis window.

7. The method of claim 1, wherein defining the plurality of reference lines for the wellbore path comprises defining a first reference line which extends from a survey station to a subsequent survey station.

8. The method of claim 7, wherein determining the plurality of displacements comprises determining a first maximum displacement of the wellbore path from the first reference line and denoting a location of the first maximum displacement as being a first contact point.

9. The method of claim 8, wherein the location of the first maximum displacement is defined as a location at which the first reference line extends beyond an effective inner diameter ($D_{eff}$) of an analysis width of an outer periphery of a model device with a specified length that can be placed at, or passed through, a portion of the wellbore defined by the analysis window.

10. The method of claim 8, wherein defining the plurality of reference lines for the wellbore path comprises defining a second reference line which extends from the first contact point to a subsequent survey station.

11. The method of claim 10, wherein determining the plurality of displacements comprises determining a second maximum displacement of the wellbore path from the second reference line and denoting a location of the second maximum displacement as being a second contact point.

12. The method of claim 11, further comprising defining a third reference line and determining a third maximum displacement of the wellbore path from the third reference line and denoting a location of the third maximum displacement as being a third contact point.

13. The method of claim 12, wherein a location of at least one of the first contact point, the second contact point, and the third contact point is adjusted using an adjustment reference line defined using other contact points.

14. The method of claim 11, further comprising quantifying a degree of bend at a contact point as a normalized displacement equal to a maximum displacement of the contact point divided by a length of a straight reference line extending between a previous contact point and a subsequent contact point.

15. The method of claim 14, further comprising setting a threshold level and performing a comparison of some or all of the normalized displacements to the threshold level.

16. The method of claim 15, further comprising using the comparison to determine potential locations along the wellbore path for rod guides to be placed.

17. The method of claim 1, further comprising selecting, using at least some of the plurality of displacements, a position within a wellbore to place a device and playing the device at the position.

18. The method of claim 17, wherein the device comprises a pump or a rod guide.

19. A computer system comprising:
a memory; and
a processor configured to:
receive survey data corresponding to a plurality of survey stations of a wellbore survey of a wellbore path, wherein the received survey data comprises gyroscopic data, data from magnetic instruments, or combinations thereof;
define a plurality of reference lines for the wellbore path based on the received survey data; and
determine a plurality of displacements of the wellbore path from the plurality of reference lines.

20. A non-transitory computer-readable medium having instructions stored thereon which instruct a computer system to at least:
receive survey data corresponding to a plurality of survey stations of a wellbore survey of a wellbore path, wherein the received survey data comprises gyroscopic data, data from magnetic instruments, or combinations thereof;
define a plurality of reference lines for the wellbore path based on the received survey data; and
determine a plurality of displacements of the wellbore path from the plurality of reference lines.

21. The method of claim 1, wherein the wellbore path comprises a central line of a wellbore.

* * * * *